United States Patent
Kinoshita

(10) Patent No.: US 10,136,059 B2
(45) Date of Patent: Nov. 20, 2018

(54) ELECTRONIC APPARATUS, METHOD FOR CONTROL ROLLING ELECTRONIC APPARATUS, AND CONTROL PROGRAM

(71) Applicant: NIKON CORPORATION, Tokyo (JP)

(72) Inventor: Akira Kinoshita, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/025,737

(22) PCT Filed: Sep. 30, 2014

(86) PCT No.: PCT/JP2014/076050
§ 371 (c)(1),
(2) Date: Mar. 29, 2016

(87) PCT Pub. No.: WO2015/046565
PCT Pub. Date: Apr. 2, 2015

(65) Prior Publication Data
US 2016/0219218 A1    Jul. 28, 2016

(30) Foreign Application Priority Data

Sep. 30, 2013 (JP) ................................ 2013-203501

(51) Int. Cl.
*H04N 5/232* (2006.01)
*G03B 17/14* (2006.01)
(Continued)

(52) U.S. Cl.
CPC ......... *H04N 5/23241* (2013.01); *G03B 17/14* (2013.01); *H04N 5/23293* (2013.01);
(Continued)

(58) Field of Classification Search
CPC ...... H04N 5/23241; H04N 5/343; H04N 5/30; H04N 5/2628; H04N 5/23293;
(Continued)

(56) References Cited

U.S. PATENT DOCUMENTS 7,106,374 B1 *  9/2006  Bandera ................. H04N 5/232
                                                       348/170
8,508,639 B2    8/2013  Mabuchi et al.
(Continued)

FOREIGN PATENT DOCUMENTS

JP      2004-072278 A    3/2004
JP      2008-017090 A    1/2008
(Continued)

OTHER PUBLICATIONS

Dec. 22, 2014 International Search Report issued in International Patent Application No. PCT/JP2014/076050.
(Continued)

*Primary Examiner* — Timothy J Henn
(74) *Attorney, Agent, or Firm* — Oliff PLC

(57) ABSTRACT

To reduce power consumed when the display magnification of an image is changed. A digital camera includes a display unit having a first display region in which a first image is displayed and a second display region in which a second image is displayed, an image capture unit having a first image capture region in which first image data indicating the first image is generated and a second image capture region in which second image data indicating the second image is generated, magnification change units that change the display magnifications of the first and second images displayed on the display unit, and an image capture control unit that when the magnification change units change the display magnifications, changes the charge accumulation conditions or reading conditions of the first and second image capture regions.

16 Claims, 23 Drawing Sheets

(51) Int. Cl.
  *H04N 5/262* (2006.01)
  *H04N 5/30* (2006.01)
  *H04N 5/343* (2011.01)
  *H04N 5/345* (2011.01)

(52) U.S. Cl.
  CPC ....... *H04N 5/23296* (2013.01); *H04N 5/2628* (2013.01); *H04N 5/30* (2013.01); *H04N 5/343* (2013.01); *H04N 5/3454* (2013.01); *G03B 2206/00* (2013.01)

(58) Field of Classification Search
  CPC .. H04N 5/23296; H04N 5/3454; G03B 17/14; G03B 2206/00
  See application file for complete search history.

(56) References Cited

U.S. PATENT DOCUMENTS

| | | | | |
|---|---|---|---|---|
| 8,823,857 | B2* | 9/2014 | Kazama | H04N 5/23212 348/333.05 |
| 2004/0174444 | A1* | 9/2004 | Ishii | H04N 5/232 348/240.1 |
| 2004/0201767 | A1* | 10/2004 | Niikawa | H04N 5/23212 348/333.03 |
| 2005/0128333 | A1* | 6/2005 | Park | H04N 5/23296 348/333.12 |
| 2007/0098396 | A1* | 5/2007 | Watanabe | H04N 5/23212 396/374 |
| 2007/0285534 | A1* | 12/2007 | Makioka | G06T 3/40 348/240.99 |
| 2008/0024643 | A1* | 1/2008 | Kato | G06K 9/00255 348/333.01 |
| 2008/0122951 | A1 | 5/2008 | Yamamoto | |
| 2008/0240563 | A1* | 10/2008 | Takano | H04N 5/23219 382/173 |
| 2009/0009652 | A1* | 1/2009 | Sudo | H04N 5/772 348/349 |
| 2009/0160947 | A1 | 6/2009 | Shigeta et al. | |
| 2010/0002940 | A1 | 1/2010 | Aoki et al. | |
| 2010/0272368 | A1* | 10/2010 | Su | G06K 9/00228 382/195 |
| 2013/0170754 | A1* | 7/2013 | Tsukizawa | G06K 9/00604 382/195 |
| 2014/0046131 | A1 | 2/2014 | Morita et al. | |
| 2015/0077590 | A1 | 3/2015 | Kuriyama et al. | |

FOREIGN PATENT DOCUMENTS

| | | |
|---|---|---|
| JP | 2008-236799 A | 10/2008 |
| JP | 2009-086490 A | 4/2009 |
| JP | 2009-171545 A | 7/2009 |
| JP | 2012-104918 A | 5/2012 |
| JP | 2012-245157 A | 12/2012 |

OTHER PUBLICATIONS

Apr. 5, 2016 International Preliminary Report on Patentability issued in International Patent Application No. PCT/JP2014/076050.
Apr. 12, 2017 Search Report issued in European Application No. 14849181.4.
Nov. 14, 2017 Office Action issued in Japanese Application No. 2013-203501.
Feb. 14, 2018 Office Action issued in Chinese Application No. 201480053867.1.
Aug. 29, 2018 Office Action issued in Chinese Application No. 201480053867.1.

* cited by examiner (A)

(B)

(A)

(B)

(A)

(B)

(A)

(B)

ELECTRONIC APPARATUS, METHOD FOR CONTROL ROLLING ELECTRONIC APPARATUS, AND CONTROL PROGRAM

TECHNICAL FIELD

The present invention relates to an electronic apparatus, a method for controlling an electronic apparatus, and a control program.

BACKGROUND ART

Electronic apparatuses each including an image sensor in which a back-illuminated image-capture chip and a signal processing chip are stacked (hereafter referred to as a stacked image sensor) have been proposed (for example, see Patent Literature 1). In a stacked image sensor, a back-illuminated image capture chip and a signal processing chip are stacked so as to be connected via micro-bumps corresponding to blocks each including multiple pixels.

CITATION LIST

Patent Literature

[Patent Literature 1] Japanese Unexamined Patent Application Publication No. 2006-49361

SUMMARY OF INVENTION

Technical Problem

However, there have been proposed only a few electronic apparatuses including a stacked image sensor that captures images on a multiple-block basis. Accordingly, the usability of electronic apparatuses including a stacked image sensor has not been sufficiently improved.

An object of an aspect of the present invention is to reduce power consumed when the display magnification of an image is changed.

Solution to Problem

A first aspect of the present invention provides an electronic apparatus including a display unit having a first display region in which a first image is displayed and a second display region in which a second image is displayed, an image capture unit having a first image capture region in which first image data indicating the first image is generated and a second image capture region in which second image data indicating the second image is generated, a magnification change unit configured to change display magnifications of the first and second images displayed on the display unit, and an image capture control unit configured to, when the magnification change unit changes the display magnifications, changes charge accumulation conditions or reading conditions of the first and second image capture regions.

A second aspect of the present invention provides a method for controlling an electronic apparatus, the electronic apparatus including a display unit having a first display region in which a first image is displayed and a second display region in which a second image is displayed and an image capture unit having a first image capture region in which first image data indicating the first image is generated and a second image capture region in which second image data indicating the second image is generated. The method includes changing display magnifications of the first and second images displayed on the display unit; and when the display magnifications are changed, changing charge accumulation conditions or reading conditions of the first and second image capture regions.

A third aspect of the present invention provides a control program for causing a control unit of an electronic apparatus to perform a magnification change process and an image capture control process. The electronic apparatus includes a display unit having a first display region in which a first image is displayed and a second display region in which a second image is displayed and an image capture unit having a first image capture region in which first image data indicating the first image is generated and a second image capture region in which second image data indicating the second image is generated. The magnification change process is a process of changing display magnifications of the first and second images displayed on the display unit. The image capture control process is a process of, when the display magnifications are changed in the magnification change process, changing charge accumulation conditions or reading conditions of the first and second image capture regions.

Advantageous Effects of the Invention

According to this configuration, it is possible to reduce power consumed when the display magnification of an image is changed.

DESCRIPTION OF EMBODIMENTS

Now, embodiments of the present invention will be described with reference to the drawings. However, the present invention is not limited thereto. To clarify the embodiments, the drawings may be scaled as appropriate, for example, partially enlarged or highlighted. In the embodiments below, interchangeable-lens digital cameras will be used as examples of electronic apparatuses.

First Embodiment

Figure 1:
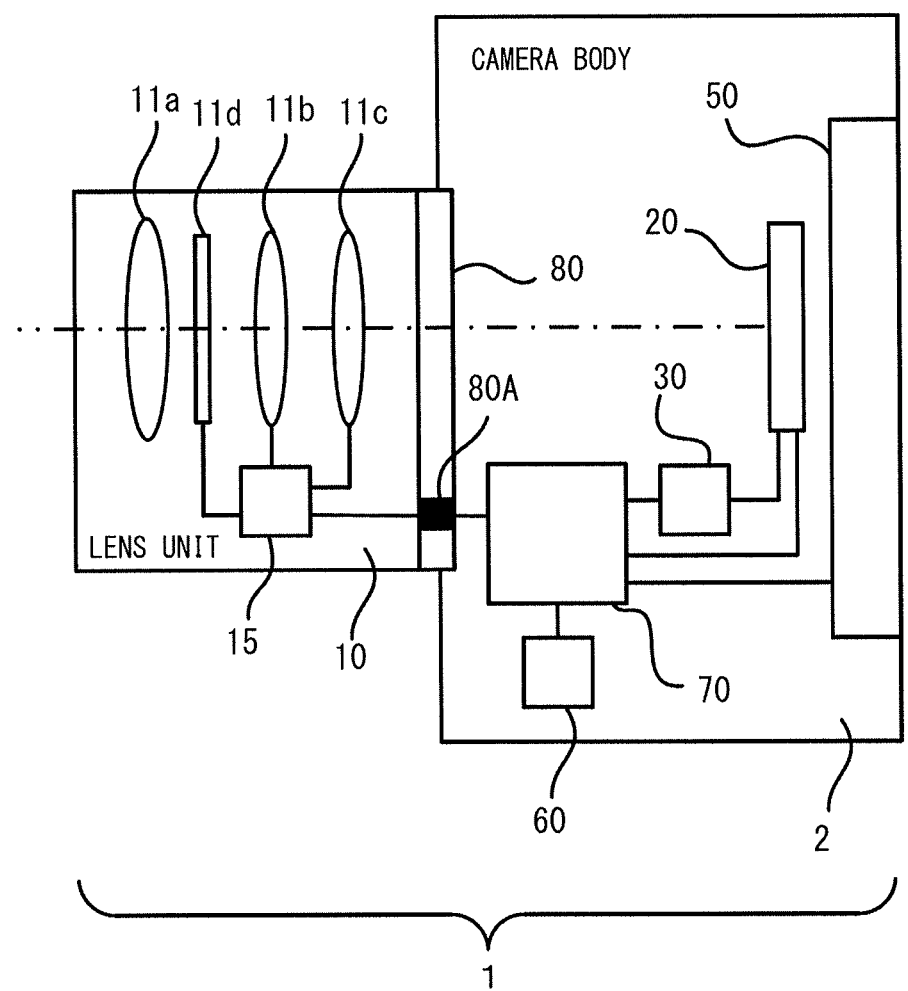
FIG. 1 is a cross-sectional view showing a schematic configuration of a digital camera, which is an electronic apparatus.

FIG. 1 is a cross-sectional view showing a schematic configuration of a digital camera, which is an example of an electronic apparatus. A digital camera (electronic apparatus) 1 according to the present embodiment includes a lens unit 10 serving as an interchangeable lens and a camera body 2. The lens unit 10 is inserted into the camera body 2 through a mounting part 80. The lens unit 10 including various types of image capture optical systems can be inserted into the camera body 2 through the mounting part 80. Hereafter, the image capture optical systems (a lens 11a, a zoom lens 11b, a focus lens 11c) in the lens unit 10 will be collectively referred to as the "image capture optical system 11."

The lens unit 10 includes the lens 11a, the zoom lens 11b, the focus lens 11c, a diaphragm 11d, and a lens drive controller 15. The lens drive controller 15 includes a central processing unit (CPU), a memory, and a drive control circuit. The lens drive controller 15 communicates with a system control unit 70 in the camera body 2 through an electrical contact 80A. Specifically, the lens drive controller 15 transmits lens information about properties of the lens 11a (lens size, etc.) to the system control unit 70 and receives control information (the amount of movement of the zoom lens 11b, the amount of movement of the focus lens 11c, the aperture value of the diaphragm 11d, etc.) therefrom.

To control the focus of the image capture optical system 11, the lens drive controller 15 causes the drive control circuit to control the drive of the focus lens 11c on the basis of control information transmitted by the system control unit 70. Also, to control zooming, the lens drive controller 15 causes the drive control circuit to control the drive of the zoom lens 11b on the basis of control information transmitted by the system control unit 70. The diaphragm 11d forms an aperture which controls the amount of light and the amount of blur and whose diameter is variable centered on the optical axis. To control the aperture diameter of the diaphragm 11d, the lens drive controller 15 causes the drive control circuit to control the drive of the diaphragm 11d on the basis of control information transmitted by the system control unit 70.

When the drive control circuit controls the drive of the zoom lens 11b, the focal length is changed without changing the focal position and thus the display magnification of an image displayed on a display unit 50 is changed (increased or reduced). Changing the display magnification of an image by moving the zoom lens 11b is called an "optical zoom."

The camera body 2 includes an image capture unit 20 including a stacked image sensor, an image processing unit 30, a display unit 50, a storage unit 60, and the system control unit 70. A light beam passed through the lens unit 10 forms a subject image on the light receiving surface of the image sensor of the image capture unit 20. The image sensor photoelectrically converts the subject image and transmits signals of the pixels thereof to the image processing unit 30. The image processing unit 30 performs various types of image processing on raw data composed of, the pixel signals to generate image data. The display unit 50 displays the image data generated by the image processing unit 30. The storage unit 60 stores the image data generated by the image processing unit 30.

As used herein, the term "image data" refers to data forming an image (still image, moving image, live view image) captured by the image capture unit 20. The image data includes data which has yet to be processed by the image processing unit 30 (i.e., raw data) and data which has been processed thereby. The term "raw data" refers to image data which has yet to be processed by the image processing unit 30. Hereafter, the term "image data" may be referred to as "image signal."

The term "live view images" refer to images displayed on the display unit 50 on the basis of image data sequentially generated and outputted by the image processing unit 30. The user uses live view images to check images of the subject being captured by the image capture unit 20. Live view images are also called through images or preview images.

The system control unit 70 controls the entire processing and operation of the digital camera 1. The system control unit 70 includes a central processing unit (CPU). Details of processing and operation performed by the system control unit 70 will be described later (see FIGS. 6 and 7). Details of the elements in the camera body 2 will also be described later (see FIG. 6).

Figure 2:
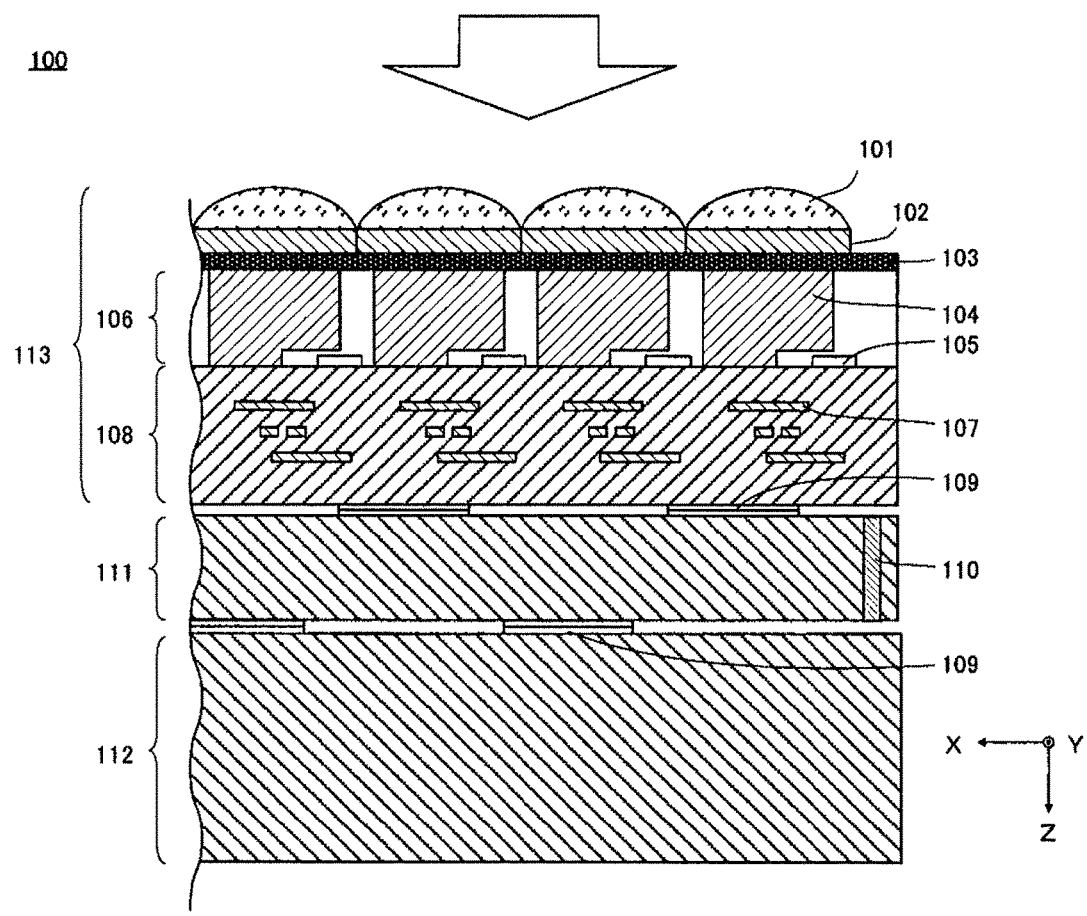
FIG. 2 is a sectional view of a stacked image sensor.

FIG. 2 is a sectional view of a stacked image sensor. This stacked image sensor is the image sensor 100 disposed in the image capture unit 20 shown in FIG. 1. The stacked image sensor 100 is disclosed in Japanese Patent Application No. 2012-139026 previously filed by the present applicant. The image sensor 100 includes an image-capture chip 113 configured to out put a pixel signal corresponding to incident light, a signal processing chip 111 configured to process the pixel signal, and a memory chip 112 configured to store the pixel signal. The image-capture chip 113, signal processing chip 111, and memory chip 112 are stacked and electrically connected to one another via conductive bumps 109 such as Cu.

As shown in FIG. 2, incident light enters the image sensor 100 in a positive z-axis direction mainly shown by an outline arrow. In the present embodiment, the incident light entry surface of the image-capture chip 113 is referred to as a back surface. Further, as shown by coordinate axes, the direction which is perpendicular to the z-axis and oriented to the left side of the drawing is referred to as a positive x-axis direct ion, and the direction which is perpendicular to the z- and x-axes and oriented to the viewer is referred to as a positive y-axis direction. In the following some drawings, coordinate axes are shown using the coordinate axes of FIG. 2 as a reference so that the orientations of such drawings are understood.

One example of the image-capture chip 113 is a back-illuminated MOS image sensor. A PD layer 106 is disposed on the back surface of a wiring layer 108. The PD layer 106 includes multiple photodiodes (PDs) 104 disposed two-dimensionally and configured to accumulate charge corresponding to incident light and transistors 105 disposed in a manner corresponding to the PDs 104.

Color filters 102 are disposed over the incident light entry surface of the PD layer 106 with a passivation film 103 therebetween. The color filters 102 are each a filter which transmits a particular wavelength range of visible light. That is, the color filters 102 include multiple color filters which transmit different wavelength ranges and are arranged in a particular manner so as to correspond to the PDs 104. The arrangement of the color filters 102 will be described later. A set of a color filter 102, a PD 104, and a transistor 105 forms one pixel.

Microlenses 101 are disposed on the incident light entry sides of the color filters 102 in a manner corresponding to the pixels. The microlenses 101 condense incident light toward the corresponding PDs 104.

The wiring layer 108 includes lines 107 configured to transmit pixel signals from the PD layer 106 to the signal processing chip 111. The lines 107 may be multilayered and may include passive and active elements. Multiple bumps 109 are disposed on the front surface of the wiring layer 108 and aligned with multiple bumps 109 disposed on the opposite surface of the signal processing chip 111. The aligned bumps 109 are bonded together and electrically connected together, for example, by pressurizing the image-capture chip 113 and signal processing chip 111.

Similarly, multiple bumps 109 are disposed on the opposite surfaces of the signal processing chip 111 and memory chip 112 and aligned with each other. The aligned bumps 109 are bonded together and electrically connected together, for example, by pressurizing the signal processing chip 111 and memory chip 112.

The methods for bonding the bumps 109 together include Cu bump bonding using solid phase diffusion, as well as micro-bump bonding using solder melting. For the bumps 109, it is only necessary to provide, for example, one bump or so with respect to one unit group (to be discussed later). Accordingly, the size of the bumps 109 may be larger than the pitch between the PDs 104. Further, bumps which are larger than the bumps 109 corresponding to a pixel region having the pixels arranged the rein (a pixel region 113A shown in FIG. 3) may be additionally provided in peripheral regions other than the pixel region.

The signal processing chip 111 includes a through-silicon via (TSV) 110 configured to connect together circuits disposed on the front and back surfaces thereof. The TSV 110 is disposed in a peripheral region. Alternatively, the TSV 110 may be disposed in a peripheral region of the image-capture chip 113 or in the memory chip 112.

Figure 3:
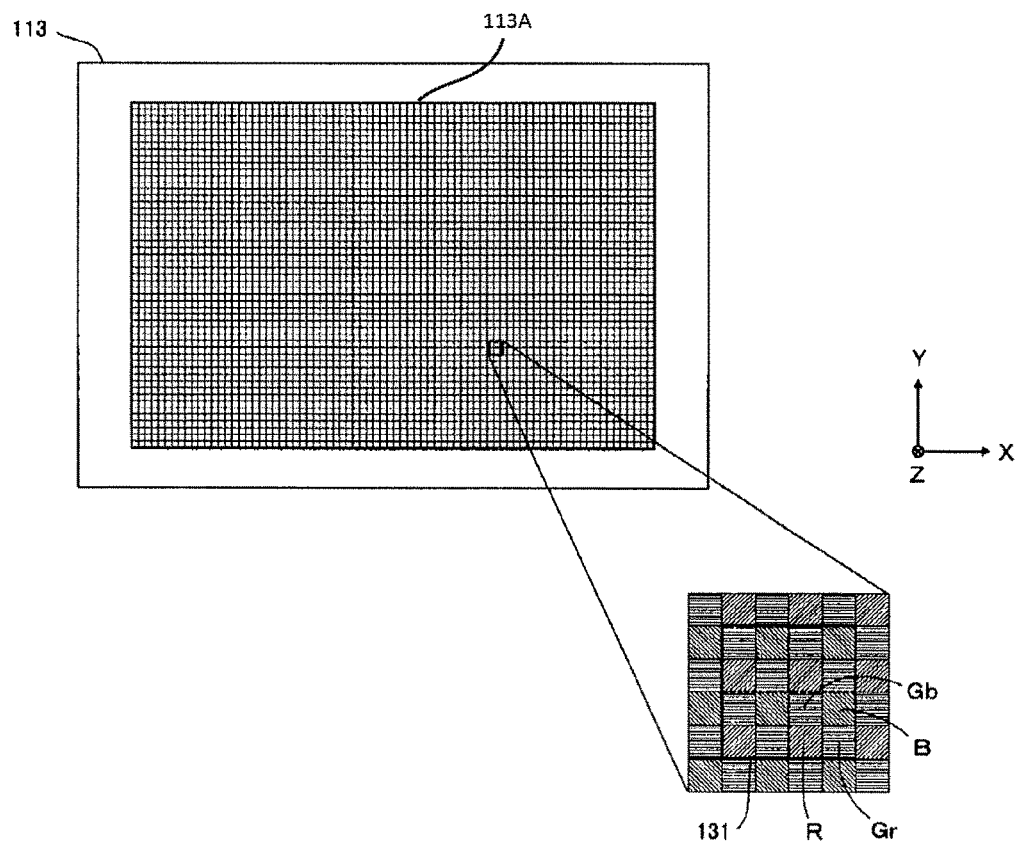
FIG. 3 is a diagram showing the pixel array of an image capture chip and a unit group.

FIG. 3 is a diagram showing the pixel array of the image-capture chip and a unit group. In FIG. 3, the image-capture chip 113 is observed from the back side. The pixel region (image capture region) 113A is the pixel-arranged region of the image-capture chip 113. In the pixel region 113A, 20 million or more pixels are arranged in a matrix. In an example shown in FIG. 3, four adjacent pixels×four adjacent pixels, that is, 16 pixels form one unit group 131.

Grid lines in FIG. 3 show a concept that adjacent pixels are grouped into unit groups 131. The number of pixels forming the unit groups 131 is not limited to that described above and may be on the order of 1000, for example, 32 pixels×64 pixels, or may be 1000 or more or less than 1000.

As shown in a partial enlarged view of the pixel region 113A, one unit group 131 includes four so-called Bayer arrays which each includes four pixels, that is, green pixels Gb, Gr, a blue pixel B, and a red pixel R and which are arranged vertically and horizontally. The green pixels are each a pixel having a green filter as a color filter 102 and receive light in the green wavelength band of incident light. Similarly, the blue pixel is a pixel having a blue filter as a color filter 102 and receives light in the blue wavelength band. The red pixel is a pixel having a red filter as a color filter 102 and receives light in the red wavelength band.

Figure 4:
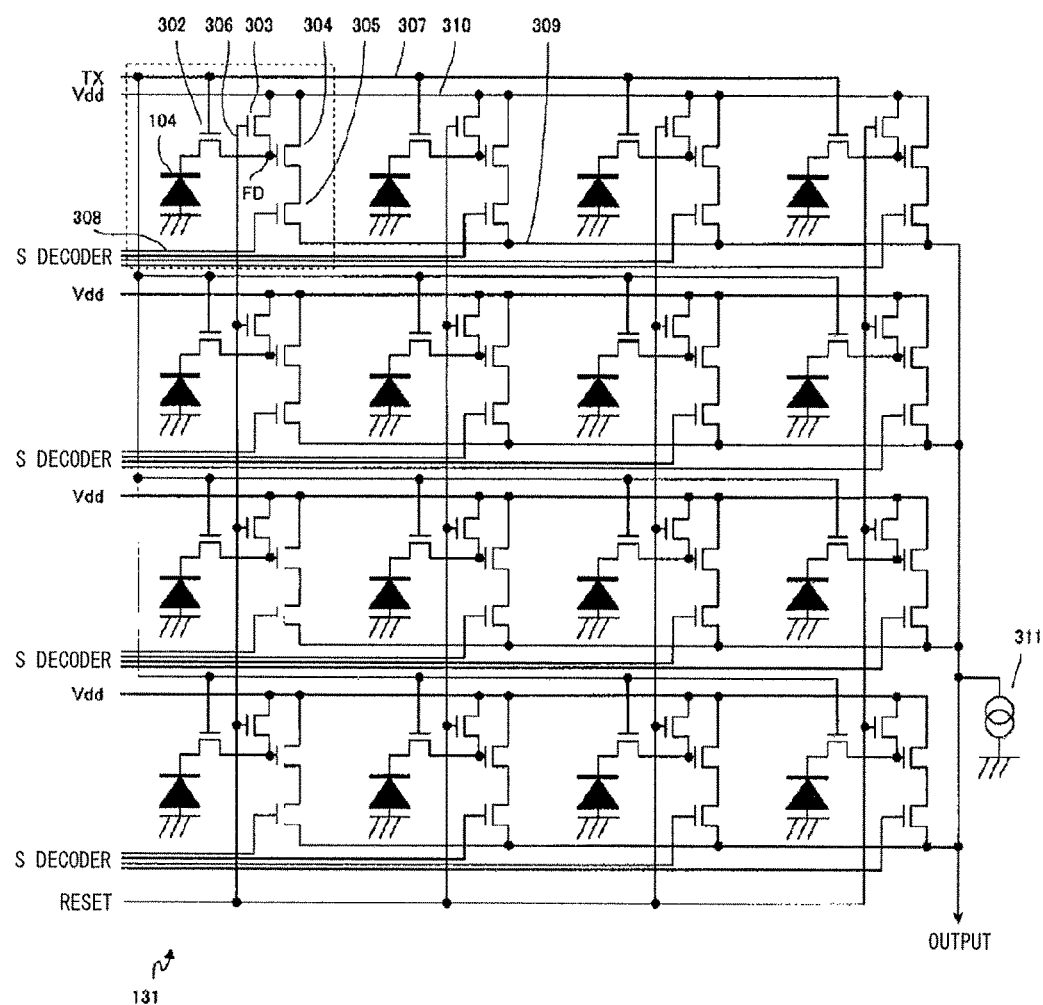
FIG. 4 is a circuit diagram of a unit group of the image capture chip.

FIG. 4 is a circuit diagram of a unit group of the image-capture chip. In FIG. 4, a rectangle surrounded by a dotted line as a representative shows the circuit of one pixel. At least part of each transistor described below corresponds to one transistor 105 in FIG. 2.

As described above, one unit group 131 includes 16 pixels. Sixteen PDs 104 included in these pixels are connected to corresponding transfer transistors 302. The gates of the transfer transistors 302 are connected to a TX line 307 through which a transfer pulse is supplied. In the present embodiment, the TX line 307 is shared by the 16 transfer transistors 302.

The drain of each transfer transistor 302 is connected to the source of a corresponding reset transistor 303, and so-called floating diffusion FD (charge detection unit) therebetween is connected to the gate of a corresponding amplifier transistor 304. The drains of the reset transistors 303 are connected to a Vdd line 310 through which a power-supply voltage is supplied. The gates of the reset transistors 303 are connected to a reset line 306 through which a reset pulse is supplied. In the present embodiment, the reset line 306 is shared by the 16 reset transistors 303.

The drains of the amplifier transistors 304 are connected to the Vdd line 310, through which a power-supply voltage is supplied. The sources of the amplifier transistors 304 are connected to the drains of corresponding select transistors 305. The gates of the select transistors 305 are connected to corresponding decoder lines 308 through which a selection pulse is supplied. In the present embodiment, the different decoder lines 308 are disposed with respect to the 16 select transistors 305. The sources of the select transistors 305 are connected to a shared output line 309. A load current source 311 supplies a current to the output line 309. That is, the output line 309 with respect to the select transistors 305 is formed by a source follower. The load current source 311 may be disposed in any of the image-capture chip 113 and signal processing chip 111.

Described below is the flow from when the accumulation of charge starts to when pixel signals are outputted after the accumulation ends. Reset pulses are applied to the reset transistors 303 through the reset line 306. Simultaneously, transfer pulses are applied to the transfer transistors 302 through the TX line 307. Thus, the potentials of the PDs 104 and floating diffusion FD are reset.

When the application of the transfer pulses is released, the PDs 104 convert received incident light into charge and accumulate it. Subsequently, when transfer pulses are applied again with reset pulses not being applied, the charge accumulated in each PD 104 is transferred to the corresponding floating diffusion FD. Thus, the potential of the floating diffusion FD is changed from the reset potential to the signal potential after the charge accumulation. When selection pulses are applied to the select transistors 305 through the decoder lines 308, the variation in the signal potential of each floating diffusion FD is transmitted to the output line 309 through the corresponding amplifier transistor 304 and select transistor 305. Based on such a circuit operation, the unit pixels output, to the output line 309, pixel signals corresponding to the reset potentials and pixel signals corresponding to the signal potentials.

As shown in FIG. 4, in the present embodiment, the reset line 306 and TX line 307 are shared by the 16 pixels forming the unit group 131. That is, reset pulses and transfer pulses a re simultaneously applied to all the 16 pixels. Accordingly, all the pixels forming the unit group 131 start to accumulate charge at the same timing and end the charge accumulation at the same timing. Note that selection pulses are sequentially applied to the select transistors 305 and therefore pixel signals corresponding to the accumulated charge are selectively out putted to the output line 309. Different reset lines 306, TX lines 307, and output lines 309 are disposed for the respective unit groups 131.

By constructing the circuit on the basis of unit groups 131 as described above, the charge accumulation time can be controlled for each unit group 131. In other words, it is possible to cause the unit groups 131 to output pixel signals based on different charge accumulation times. More specifically, by causing another unit group 131 to accumulate charge several times and to output pixel signals each time while one unit group 131 is caused to accumulate charge once, it is possible to cause the unit groups 131 to output moving image frames at differ ent frame rates.

Figure 5:
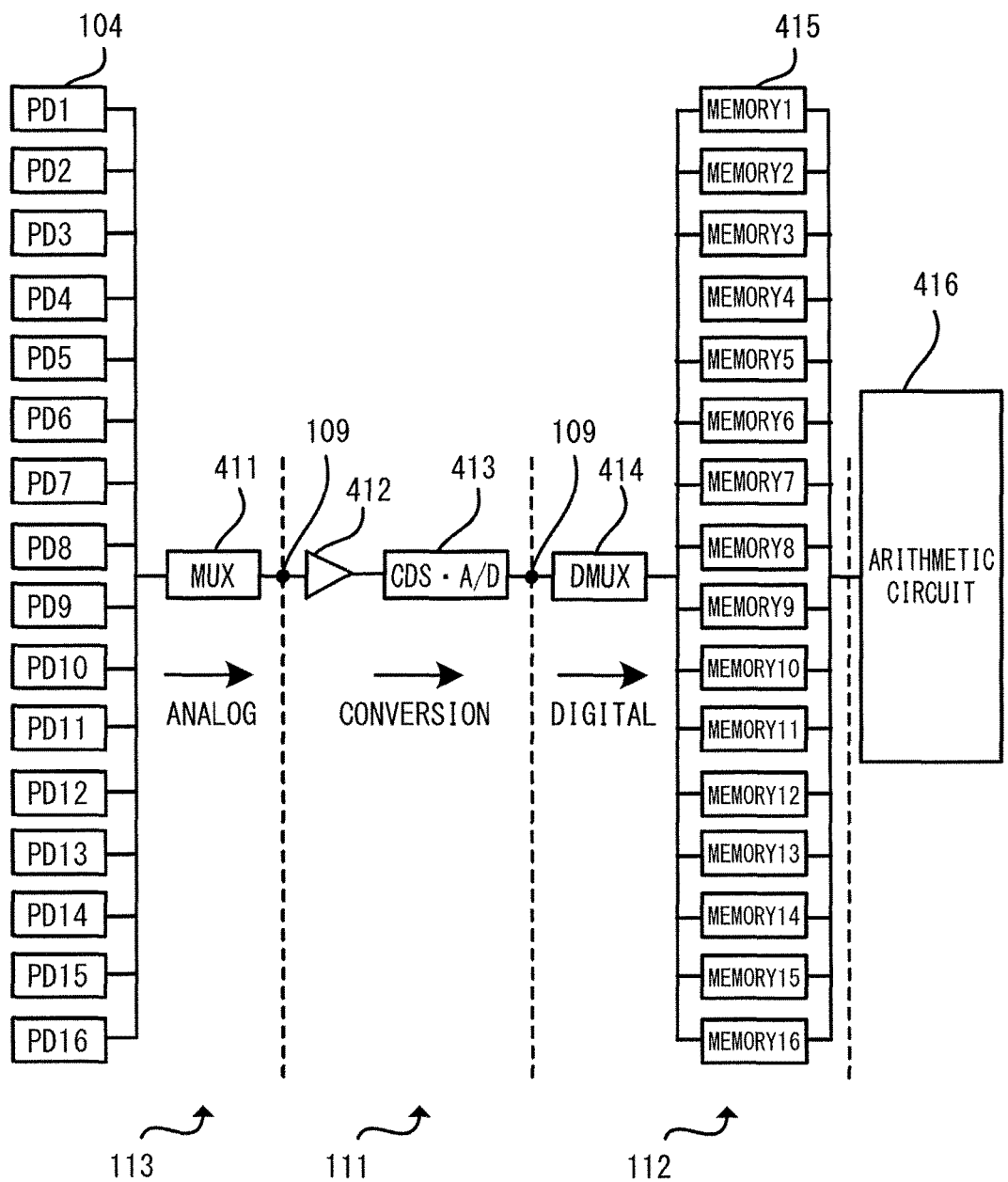
FIG. 5 is a block diagram showing the functional configuration of an image sensor.

FIG. 5 is a block diagram showing the functional configuration of the image sensor. An analog multiplexer 411 sequent Tally selects 16 PDs 104 forming one unit group 131 and causes each selected PD 104 to output a pixel signal to an output line 309 disposed in a manner corresponding to the unit group 131. The multiplexer 411 is formed along with the PDs 104 in the image-capture chip 113.

The analog pixel signals outputted through the multiplexer 411 are amplified by an amplifier 412 which is formed in the signal processing chip 111. The pixel signals amplified by the amplifier 412 are subjected to correlated double sampling CDS) and analog-to-digital (A/D) conversion by a signal processing circuit 413 formed in the signal processing chip 111 and configured to perform CDS and A/D conversion. Since the pixel signals are subjected to CDS by the signal processing circuit 413, the noise in the pixel signals is reduced. The A/D-converted pixel signals are passed to a demultiplexer 414 and then stored in corresponding pixel memories 415. The demultiplexer 414 and pixel memories 415 are formed in the memory chip 112.

An arithmetic circuit 416 processes the pixel signals stored in the pixel memories 415 and passes the resulting signals to a subsequent image processing unit. The arithmetic circuit 416 may be disposed in any of the signal processing chip 111 and memory chip 112. While the elements connected to the single unit group 131 are shown in FIG. 5, these elements are disposed for each unit group 131 in practice and operate in parallel. Note that the arithmetic circuit 416 need not necessarily be disposed for each unit group 131. For example, a single arithmetic circuit 416 may sequentially refer to and process the values in the pixel memories 415 corresponding to the respective unit groups 131.

As described above, the output lines 309 are disposed in a manner corresponding to the respective unit groups 131. In the image sensor 100, the image-capture chip 113, signal processing chip 111, and memory chip 112 are stacked. Accordingly, by using, as the output lines 309, the bumps 109 electrically connecting between the chips, the lines can be routed without enlarging the chips in the surface direction.

Next, blocks set in the pixel region 113A (see FIG. 3) of the image sensor 100 will be described. In the present embodiment, the pixel region 113A of the image sensor 100 is divided into multiple blocks. Each block includes at least one unit group 131. Pixels included in the respective blocks are controlled by different control parameters. That is, the control parameter varies between pixel signals acquired from pixels included in one block and pixel signals acquired from pixels included in another block. Examples of a control parameter include the charge accumulation time or frequency, the frame rate, the gain, the thinning-out rate (pixel thinning-out rates), the number of rows or columns whose pixel signals are summed up (pixel summation numbers), and the digitized bit number. The control parameters may be parameters used in image processing following the acquisition of image signals from the pixels.

As used herein, the charge accumulation time refers to the time from when the PDs 104 start to accumulate charge to when they end the accumulation. The charge accumulation time also refers to "exposure time" or "shutter speed." The charge accumulation frequency refers to the frequency with which the PDs 104 accumulate charge per unit time. The frame rate refers to the number of frames processed (displayed or recorded) per unit time in a moving image. The frame rate is expressed in frames per second (fps). As the frame rate is increased, a subject (i.e., subjects whose images are to be captured) moves more smoothly in a moving image.

The gain refers to the gain factor (amplification factor) of the amplifier 412. By changing the gain, the ISO sensitivity can be changed. The ISO sensitivity is a standard for photographic films developed by the ISO and represents the level of the weakest light which a photographic film can record. Typically, the sensitivity of image sensors is represented by the ISO sensitivity. In this case, the ability of the image sensor 100 to capture light is represented by the value of the ISO sensitivity. When the gain is increased, the ISO sensitivity is increased as well. For example, when the gain is doubled, the electrical signal (pixel signal) is doubled as well. Thus, appropriate brightness is obtained even when the amount of incident light is halved. However, the increase in gain amplifies noise included in the electric signal, thereby increasing noise.

The thinning-out rate refers to the ratio of the number of pixels from which pixel signals are not read to the total number of pixels in a predetermined region. For example, a thinning-out rate of a predetermined region of 0 means that pixel signals are read from all pixels in the predetermined region. A thinning-out rate of a predetermined region of 0.5 means that pixel signals are read from half the pixels in the predetermined region. Specifically, where a unit group 131 is a Bayer array, one Bayer array unit from which pixel signals are read and one Bayer array unit from which pixel signals are not read are alternately set in the vertical direction, that is, two pixels (two rows) from which pixel signals are read and two pixels (two rows) from which pixel signals are not read are alternately set in the vertical direction. On the other hand, when the pixels from which pixel signals are read are thinned out, the resolution of images is reduced. However, 20 million or more pixels are arranged in the image sensor 100 and therefore, even when the pixels are thinned out, for example, at a thinning-out rate of 0.5, images can be displayed with 10 million or more pixels. For this reason, the user (operator) seems not to worry about such a resolution reduction.

The number of rows whose pixel signals are summed up refers to the number of vertically adjacent pixels whose pixel signals are summed up. The number of columns whose pixel signals are summed up refers to the number of horizontally adjacent pixels whose pixel signals are summed up. Such a summation process is performed, for example, in the arithmetic circuit 416. When the arithmetic circuit 416 sums up pixel signals of a predetermined number of vertically or horizontally adjacent pixels, there is obtained an effect similar to that obtained by thinning out the pixels at a predetermined thinning-out rate and reading pixel signals from the resulting pixels. In the summation process, an average value may be calculated by dividing the sum of the pixel signals by the row number or column number obtained by the arithmetic circuit 416.

The digitized bit number refers to the number of bits of a digital signal converted from an analog signal by the signal processing circuit 413. As the number of bits of a digital signal is increased, luminance, color change, or the like is re presented in more detail.

In the present embodiment, the term "charge accumulation conditions" refer to conditions on the accumulation of charge in the image sensor 100. Specifically, the charge accumulation conditions refer to the charge accumulation time or frequency, frame rate, and gain among the control parameters. Since the frame rate can vary with the charge accumulation time or frequency, it is included in the charge accumulation conditions. Similarly, the correct amount of exposure can vary with the gain, and the charge accumulation time or frequency can vary with the correct amount of exposure. Accordingly, the gain is included in the charge accumulation conditions.

In the present embodiment, the term "reading conditions" refer to conditions on the reading of pixel signals by the image sensor 100. Specifically, the reading conditions refer to thinning-out rate and the number of rows or columns whose pixel signals are summed up (the number of rows or columns whose pixel signals are summed up; hereafter referred to as "the pixel summation number" or "the summation number") among the control parameters. The number of pixel signals outputted from the image sensor 100 varies with the thinning-out rate and summation number.

In the present embodiment, the term "image capture conditions" refer to conditions on image-capture of a subject. Specifically, the image capture conditions refer to control parameters including the charge accumulation conditions and reading conditions. The image capture conditions includes control parameters for controlling the image sensor 100 (e.g., the charge accumulation time or frequency, frame rate, gain), as well as control parameters for controlling reading of signals from the image sensor 100 (e.g., thinning-out rate, the number of rows or columns whose pixel signals are summed up) and control parameters for processing signals from the image sensor 100 (e.g., digitized bit number, control parameters that the image processing unit 30 (to be discussed later) uses to process images).

Figure 6:
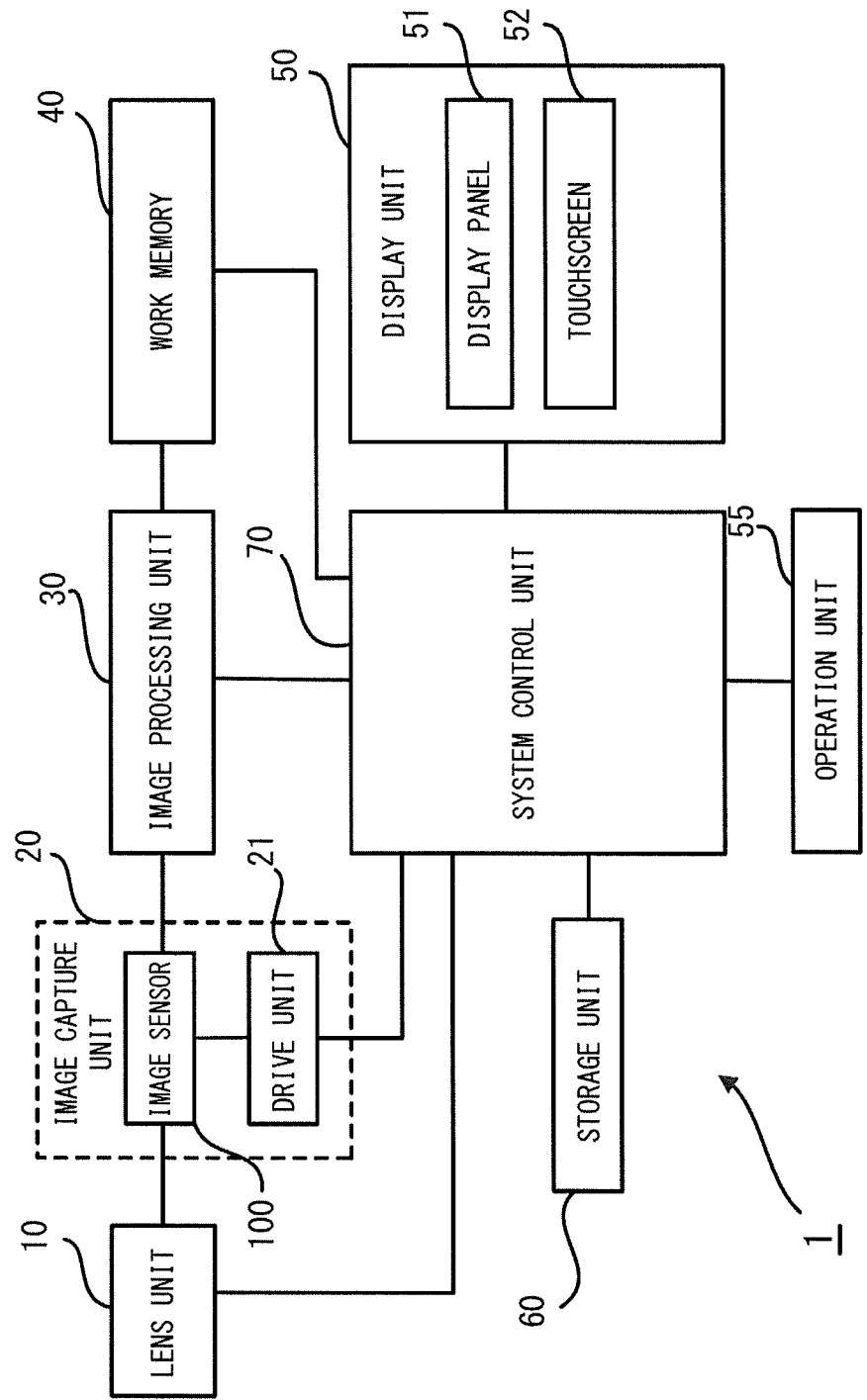
FIG. 6 is a block diagram showing the configuration of the digital camera, which is an electronic apparatus.

FIG. 6 is a block diagram showing the configuration of the digital camera (electronic apparatus) according to the first embodiment. As shown in FIG. 6, the digital camera 1, which is an electronic apparatus, includes the camera body 2 and lens unit 10. As described above, the lens unit 10 is an interchangeable lens, which is detachable from the camera body 2. Accordingly, the digital camera 1 need not include the lens unit 10. Note that the lens unit 10 may be integral with the digital camera 1. The lens unit 10 connected to the camera body 2 guides a light beam from the subject to the image capture unit 20.

As described above, the lens unit 10 includes the lens drive controller 15 (see FIG. 1). The lens unit 10 also includes the multiple lenses forming the image capture optical system 11, that is, the lens 11a, zoom lens 11b, and focus lens 11c. When the lens unit 10 is connected to the camera body 2, the lens drive controller 15 transmits lens information stored in the memory to the system control unit of the camera body 2. Also, when the lens unit 10 is connected to the camera body 2, the lens drive controller 15 receives control information from the system control unit 70, and the lens drive controller 15 controls the drive of the zoom lens 11b, focus lens 11c, and diaphragm 11d on the basis of the control information.

As shown in FIG. 6, the camera body 2 includes the image capture unit 20, the image processing unit 30, a work memory 40, the display unit 50, an operation unit 55, the storage unit 60, and the system control unit 70.

The image capture unit 20 includes the image sensor 100 and a drive unit 21. The drive unit 21 is a control circuit that controls the drive of the image sensor 100 in accordance with an instruction from the system control unit 70. Specifically, the drive unit 21 controls the charge accumulation time or frequency, which is a control parameter, by controlling the timing (or the cycle of the timing) when reset pulses or transfer pulses are applied to the reset transistors 303 or transfer transistors 302, respectively. The drive unit 21 also controls the frame rate by controlling the timing (or the cycle of timing) when reset pulses, transfer pulses, or selection pulses are applied to the reset transistors 303, transfer transistor 302, or select transistors 305, respectively. The drive unit 21 also controls the thinning-out rate by setting pixels to which reset pulses, transfer pulses, or selection pulses are applied.

The drive unit 21 also controls the ISO sensitivity of the image sensor 100 by controlling the gain (also called the gain factor or amplification factor) of the amplifier 412. The drive unit 21 also sets the number of rows or columns whose pixel signals are summed up by transmitting an instruction to the arithmetic circuit 416. The drive unit 21 also sets the digitized bit number by transmitting an instruction to the signal processing circuit 413. The drive unit 21 also sets a region(s) in the pixel region (image capture region) 113A of the image sensor 100 in units of blocks. As seen above, the drive unit 21 serves as an image sensor control unit that causes the image sensor 100 to capture images on the image capture conditions which vary among the groups of multiple blocks and then to output pixel signals. The system control unit 70 transmits an instruction about the positions, shapes, ranges, or the like of the blocks to the drive unit 21.

The image sensor 100 passes the pixel signals from the image sensor 100 to the image processing unit 30. The image processing unit 30 performs various types of image processing on raw data composed of the pixel signals using the work memory 40 as work space to generate image data in a predetermined file format (e.g., JPEG). For example, the image processing unit 30 performs image processing as follows: it performs color signal processing (color tone correction) on the signals obtained from the Bayer array to generate RGB image signals, then performs image processing such as white balance adjustment, sharpness adjustment, gamma correction, gradation adjustment, or the like on the RGB image signals, and optionally compresses the resulting signals in a predetermined compression format (JPEG format, MPEG format, or the like). The image processing unit 30 then outputs the resulting image data to the storage unit 60. The image processing unit 30 also outputs the image data to the display unit 50.

In the present embodiment, in addition to performing the above processing, the image processing unit 30 cuts out (trims) image data of a predetermined region indicated by the system control unit 70. The system control unit 70 outputs the image data of the predetermined region cut out by the image processing unit 30 to the display unit 50 so that an image based on the image data of the predetermined region is displayed on the display panel (display surface) 51 of the display unit 50 in an enlarged manner. Cutting out part of an image and displaying the image part in an enlarged manner is called "electronic zoom" or "digital zoom."

In the present embodiment, in addition to the above processing, the image processing unit 30 detects a main subject from the image data. As used herein, the term "main subject" refers to a subject which is noted, or believed to be noted, by the user (operator), of subjects whose images are captured. The number of main subjects in the image data is not limited to one, and multiple main subjects may exist therein. In the present embodiment, in addition to the above processing, the image processing unit 30 detects feature points of the main subject from the image data. As used herein, the term "feature points" refer to featuring portions of the main subject. The number of feature points in the image data is not limited to one, and multiple feature points may exist therein.

Parameters that the image processing unit 30 refers to when performing image processing are also included in the control parameters (image capture conditions). For example, parameters, such as color signal processing (color tone correction), white balance adjustment, gradation adjustment, and compressibility are included in the control parameters. The signals read from the image sensor 100 vary with the charge accumulation time or the like, and the parameters that the image processing unit 30 refers to when performing image processing vary with the variations in the signals. The image processing unit 30 sets different control parameters for the respective blocks and performs image processing, such as color signal processing, on the basis of these control parameters.

The work memory 40 temporarily stores the image data or the like when the image processing unit 30 performs image processing. The display unit 50 displays the images (still images, moving images, live view images) captured by the image capture unit 20 or various types of information. The display unit 50 includes the display panel (display surface) 51, such as a liquid crystal display panel. A touchscreen 51 is formed on the display panel 51 of the display unit 50. When the user touches the touchscreen 51 to perform an operation, such as selection of a menu, the touchscreen 52 outputs a signal indicating the touched position to the system control unit 70.

The operation unit 55 includes operation switches operated by the user, such as a release switch (a switch pressed to capture still images), a moving image switch (a switch pressed to capture moving images), an optical zoom switch (a switch pressed to perform the optical zoom), and an electronic zoom switch (a switch pressed to perform the electronic zoom). The operation unit 55 outputs a signal corresponding to an operation performed by the user to the system control unit 70. The storage unit 60 has a card slot into which a storage medium, such as a memory card, can be inserted. The storage unit 60 stores the image data generated by the image processing unit 30 or various types of data in a storage medium inserted in the card slot. The storage unit 60 also includes an internal memory. The storage unit 60 may store the image data generated by the image processing unit 30 or various types of data in the internal memory.

The system control unit 70 controls the entire processing and operation of the digital camera 1. As described above, the system control unit 70 includes a central processing unit (CPU). In the present embodiment, the system control unit 70 divides the image capture surface (pixel region 113A) of the image sensor 100 (image capture chip 113) into multiple blocks and causes the drive unit 21 to capture images in the blocks with different charge accumulation times (or charge accumulation frequencies), different frame rates, and/or different gains. For this reason, the system control unit 70 transmits the positions, shapes, and ranges of the blocks and the charge accumulation conditions for the blocks to the drive unit 21.

The system control unit 70 also causes the image sensor 100 to capture images in the blocks at different thinning-out rates, the different numbers of rows or columns whose pixel signals are summed up, and/or different digitized bit numbers. For this reason, the system control unit 70 transmits, to the drive unit 21, the image capture conditions (thinning-out rates, the numbers of rows or columns whose pixel signals are summed up, and digitized bit numbers) for the blocks. The image processing unit 30 performs image processing on the pixel signals on image capture conditions (control parameters, such as color signal processing, white balance adjustment, gradation adjustment, and compressibility) which vary among the blocks. For this reason, the image processing unit 70 transmits, to the image processing unit 30, the image capture conditions (control parameters, such as color signal processing, white balance adjustment, gradation adjustment, and compressibility) for the blocks.

The system control unit 70 also stores the image data generated by the image processing unit 30 in the storage unit 60. The system control unit 70 also outputs the image data generated by the image processing unit 30 to the display unit 50 so that images are displayed on the display unit 50. The system control unit 70 also reads image data stored in the storage unit 60 and outputs it to the display unit 50 so that images are displayed on the display unit 50. Images displayed on the display unit 50 include still images, moving images, and live view images.

Also, in response to the user operating the optical zoom switch, the system control unit 70 outputs, to the lens drive controller 15, a control signal instructing the lens drive controller 15 to move the zoom lens 11b. The lens drive controller 15 drives the zoom lens 11b by controlling the drive control circuit on the basis of the control information outputted from the system control unit 70. Thus, the display magnification of images displayed on the display panel 51 is changed. Also, in response to the user operating the electronic zoom switch or the like, the system control unit 70 outputs, to the image processing unit 30, an instruction signal indicating a region whose image is to be cut out. Thus, an image based on the image data of the region cut out by the image processing unit 30 is displayed on the display panel 51 of the display unit 50 in a manner enlarged at a predetermined display magnification. The system control unit 70 also outputs control information to the lens drive controller 15 so that the lens drive controller 15 controls the drive of the focus lens 11c and diaphragm 11d.

Figure 7:
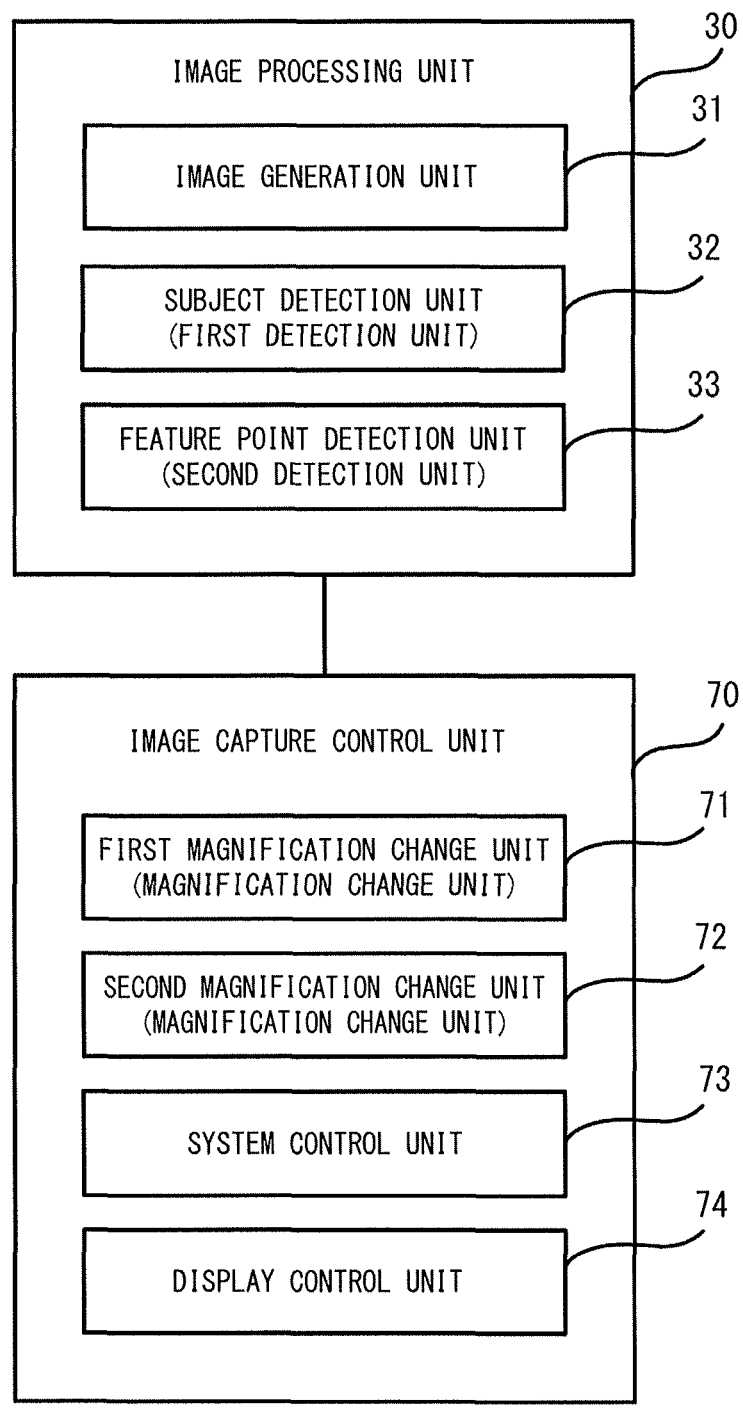
FIG. 7 is a function block diagram of an image processing unit and a system control unit shown in FIG. 6.

FIG. 7 is a function block diagram of the image processing unit and system control unit shown in FIG. 6. As shown in FIG. 7, the image processing unit 30 includes an image generation unit 31, a subject detection unit (first detection unit) 32, and a feature point detection unit (second detection unit) 33. The image generation unit 31 generates image data by performing various types of image processing on raw data outputted from the image capture unit 20 and composed of pixel signals. The subject detection unit 32 detects a main subject (e.g., a human face) from the image data generated by the image generation unit 31. For example, the subject detection unit 32 detects a main subject using a known face detection function as described in Japanese Unexamined Patent Application Publication No. 2010-16621 (US 2010/0002940). The feature point detection unit 33 detects feature points (e.g., human eyes) of the main subject from the image data generated by the image generation unit 31. For example, the feature point detection unit 33 detects feature points using a known feature point detection function as described in Japanese Unexamined Patent Application Publication No. 2010-16621 (US 2010/0002940).

The system control unit 70 includes a first magnification change unit (magnification change unit) 71, a second magnification change unit (magnification change unit) 2, an image capture control unit 73, and a display control unit 74. The first magnification change unit 71 is a processing unit that performs the optical zoom in response to the user operating the optical zoom switch. The second magnification change unit 72 is a processing unit that performs the electronic zoom in response to the user operating the electronic zoom switch or the like.

The image capture control unit 73 sets multiple regions in the pixel region (image capture region) 113A of the image sensor 100 in units of blocks. The image capture control unit 73 also sets image capture conditions (including charge accumulation conditions and reading conditions) for the multiple regions. Also, in response to the user operating the release switch or moving image switch, the image capture control unit 73 causes the drive unit 21 to control the drive of the image sensor 100. Even when live view images are being captured (that is, even after imaging is started following power-on), the image capture control unit 73 causes the drive unit 21 to control the drive of the image sensor 100. The display control unit 74 outputs the image data generated by the image generation unit 31 to the display unit 50 so that images (still images, moving images, or live view images) are displayed on the display panel 51.

Figure 8:
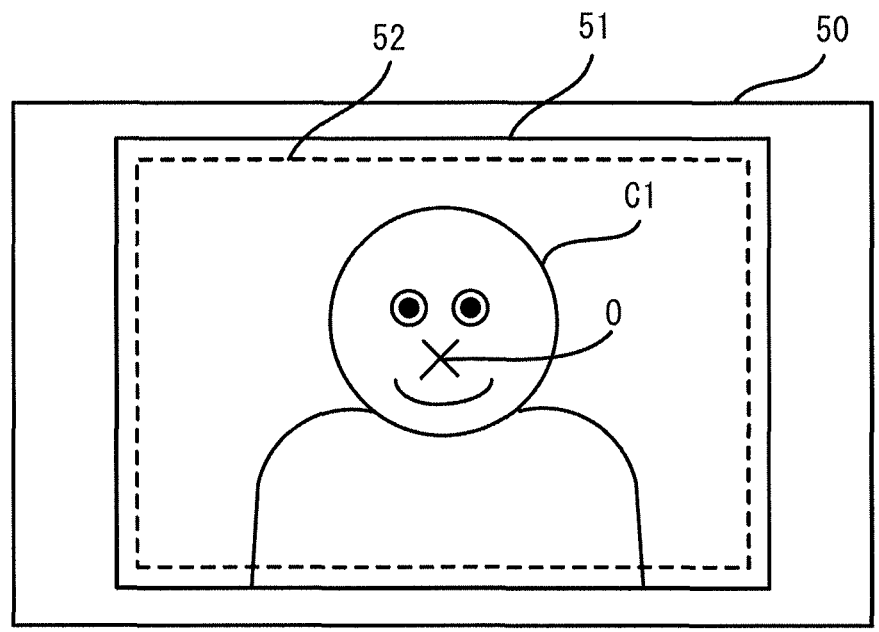
FIG. 8 is a diagram showing an example display when an optical zoom is performed.
Figure 8:
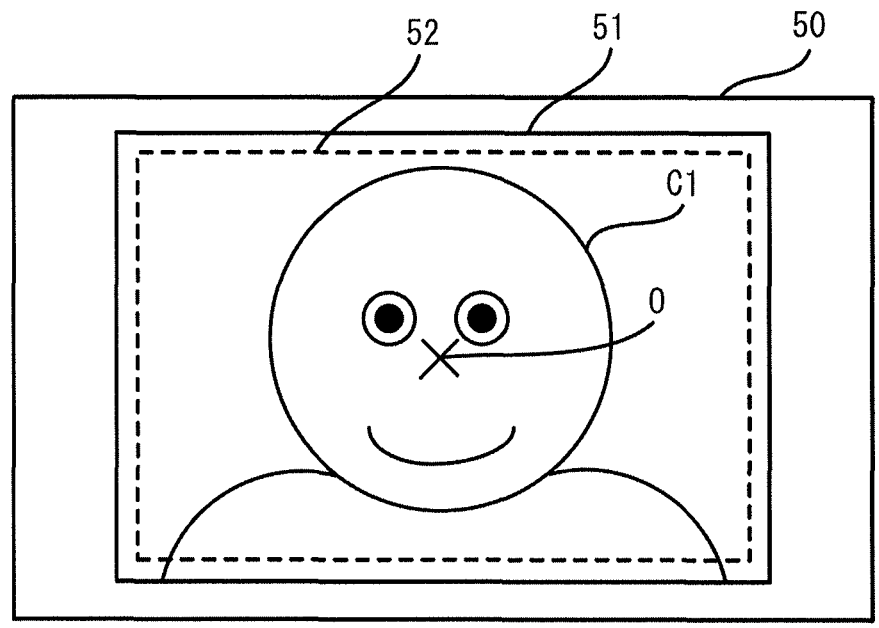

Next, the optical zoom performed by the first magnification change unit 71 will be described. FIG. 8 includes diagrams showing example displays when the optical zoom is performed. As shown in FIGS. 8(A) and 8(B), the touchscreen 52 is formed on the display panel 51 of the display unit 50. Also, as shown in FIGS. 8(A) and 8(B), the optical axis (optical center) O of the image capture optical system 11 is located in the center of the display panel 51. In the example display shown in FIG. 8(A), a human image C1 is displayed approximately in the center of the display panel 51. The user can enlarge the human image C1 by operating the optical zoom switch in a particular direction; the user can shrink the human image C1 by operating the optical zoom switch in a direction reverse to the particular direction.

When the first magnification change unit 71 receives a signal indicating that the user has operated the optical zoom switch in the particular direction, it outputs, to the lens drive controller 15, a control signal instructing the lens drive controller 15 to move the zoom lens 11b in a direction [a direction in which the human image C1 is enlarged in FIG. 8(A)] corresponding to the particular direction. The lens drive controller 15 moves the zoom lens 11b in the direction corresponding to the particular direction on the basis of the control signal transmitted from the first magnification change unit 71. By moving the zoom lens 11b, the human subject image is enlarged centered on the optical axis on the image capture surface of the image sensor 100. In the example display shown in FIG. 8(B), the human image C1 enlarged in response to the operation of the optical zoom switch by the user is displayed on the display panel 51.

Figure 9:
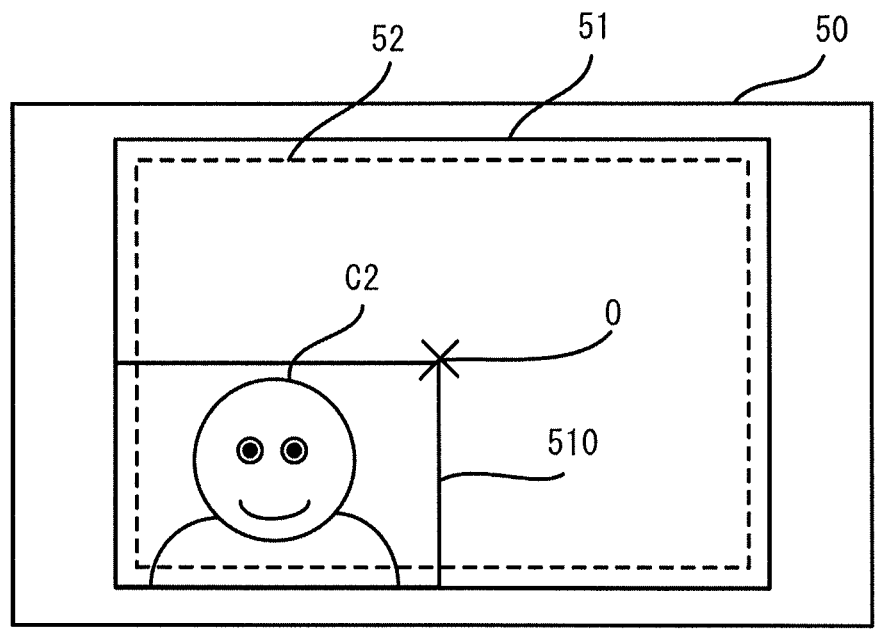
FIG. 9 is a diagram showing an example display when an electronic zoom is performed.
Figure 9:
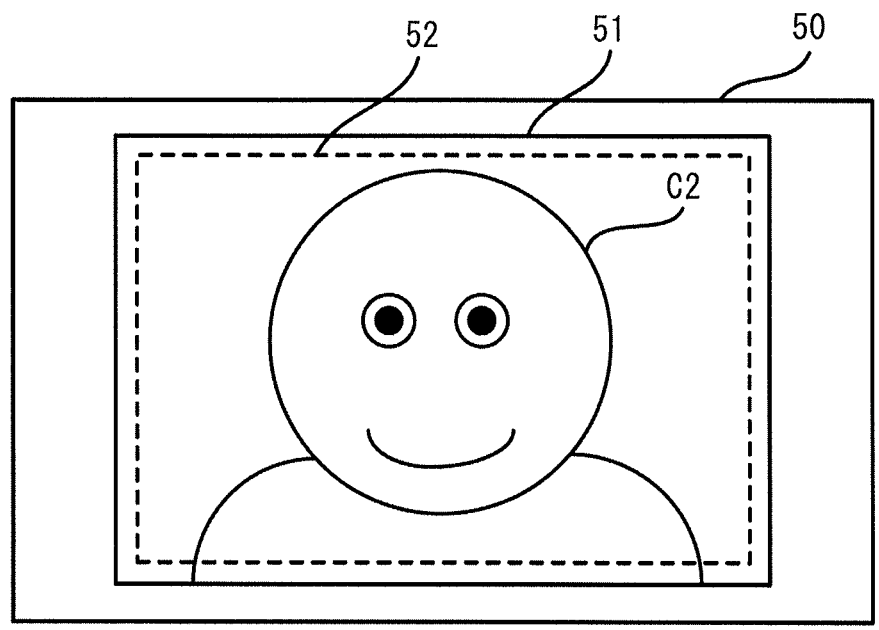

Next, the electronic zoom performed by the second magnification change unit 72 will be described. FIG. 9 includes diagrams showing example displays when the electronic zoom is performed. Also in FIGS. 9(A) and 9(B), the touchscreen 52 is formed on the display panel 51 of the display unit 50. As shown in FIG. 9(A), the optical axis (optical center) O of the image capture optical system 11 is located in the center of the display panel 51. In the example display shown in FIG. 9(A), a human image C2 is displayed on a lower-left part of the display panel 51. For example, the user selects a region 510 to be displayed in an enlarged manner by the electronic zoom, by sliding a finger on the touchscreen 52. In the example shown in FIG. 9(A), the region 510 to be displayed in an enlarged manner by the electronic zoom is a lower-left region of the display panel 51. Hereafter, the region to be displayed in an enlarged manner by the electronic zoom will be referred to as the "region to be enlarged." The user can enlarge the region 510 to be enlarged by operating the electronic zoom switch.

The second magnification change unit 72 receives a signal indicating the region 510 to be enlarged selected in response to the operation of the touchscreen 52 by the user. The image capture control unit 73 receives a signal indicating that the user has operated the electronic zoom switch and outputs, to the image processing unit 30, a signal instructing the image processing unit 30 to cut out (trim) the region 510 to be enlarged. The image generation unit 31 cuts out the image data of the region 510 to be enlarged indicated by the second magnification change unit 72. The image generation unit 31 then outputs the cut-out image data of the region 510 to be enlarged, to the display unit 50. As shown in FIG. 9(B), an image (human image C2) based on the image data of the region 510 to be enlarged is displayed over the entire surface of the display panel 51 of the display unit 50 in an enlarged manner. While, in the example shown in FIG. 9(A), the user selects the lower-left region of the display panel 51 as the region 510 to be enlarged, the user may select any region of the display panel 51.

Figure 10:
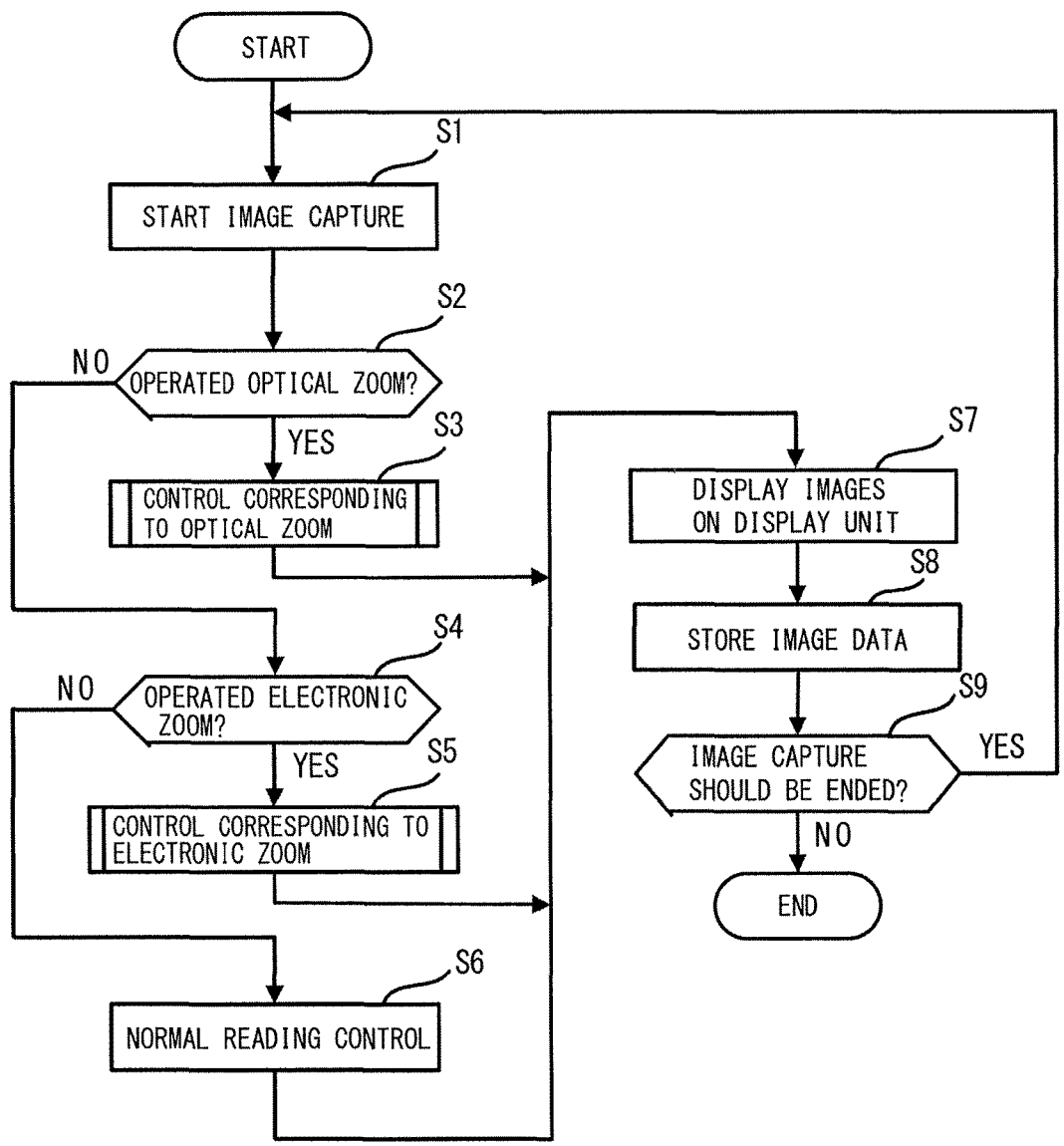
FIG. 10 is a flowchart showing an image capture process according to a first embodiment.

Next, an image capture operation according to the first embodiment will be described. FIG. 10 is a flowchart showing an image capture process (main process) according to the first embodiment. The process shown in FIG. 10 is performed when the user operates the operation unit 55 to start to capture live view images after powering on the digital camera 1 or when the user operates the operation unit (moving image switch) to start to capture moving images after powering on the digital camera 1. That is, the process shown in FIG. 10 is performed to capture live view images or moving images.

In the process shown in FIG. 10, first, the image capture control unit 73 starts image capture (step S1). Specifically, the image capture control unit 73 outputs an instruction signal to the drive unit 21 so that the drive unit 21 controls the drive of the image sensor 100 on predetermined image capture conditions (including the charge accumulation conditions and reading conditions). The system control unit 70 then determines whether the user has operated the optical zoom switch (step S2). If the system control unit 70 determines that the user has operated the optical zoom switch, the first magnification change unit 71 and image capture control unit 73 perform control corresponding to the optical zoom (step S3).

Figure 11:
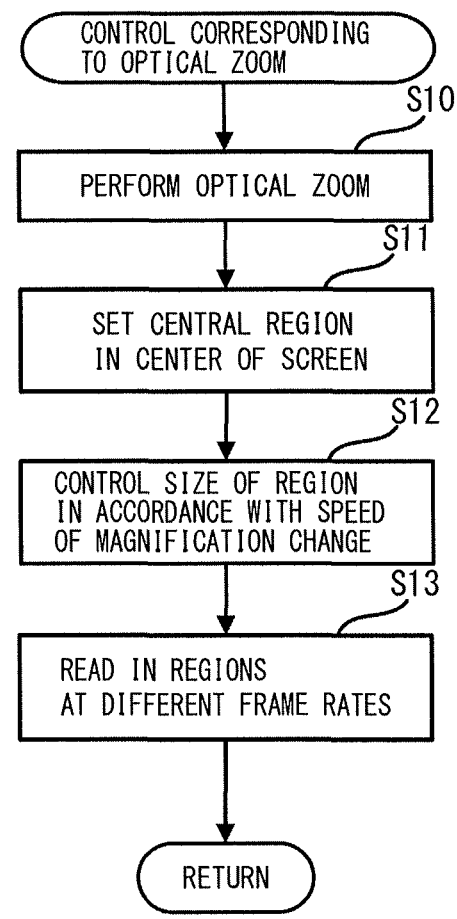
FIG. 11 is a flowchart showing control corresponding to the optical zoom shown in FIG. 10.
Figure 12:
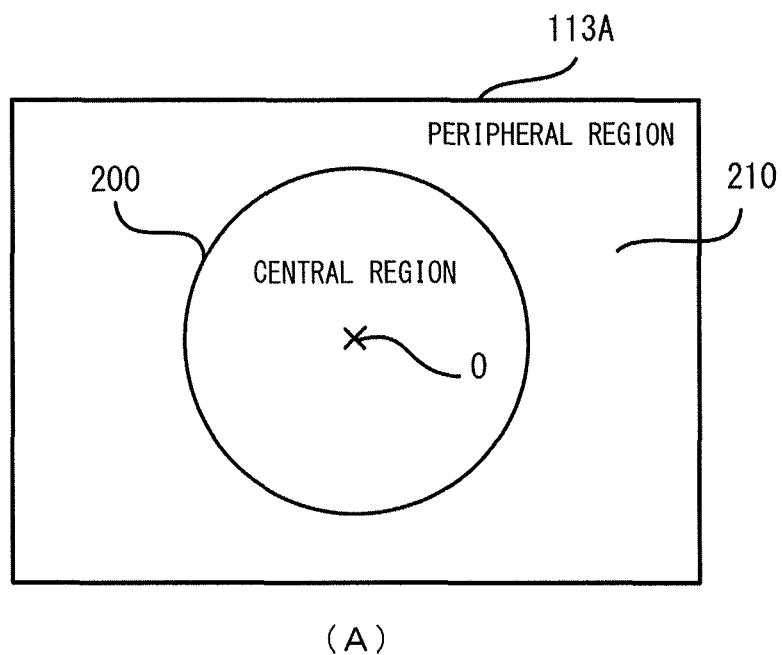
FIG. 12 includes diagrams showing a central region and a peripheral region in an image capture region.
Figure 12:
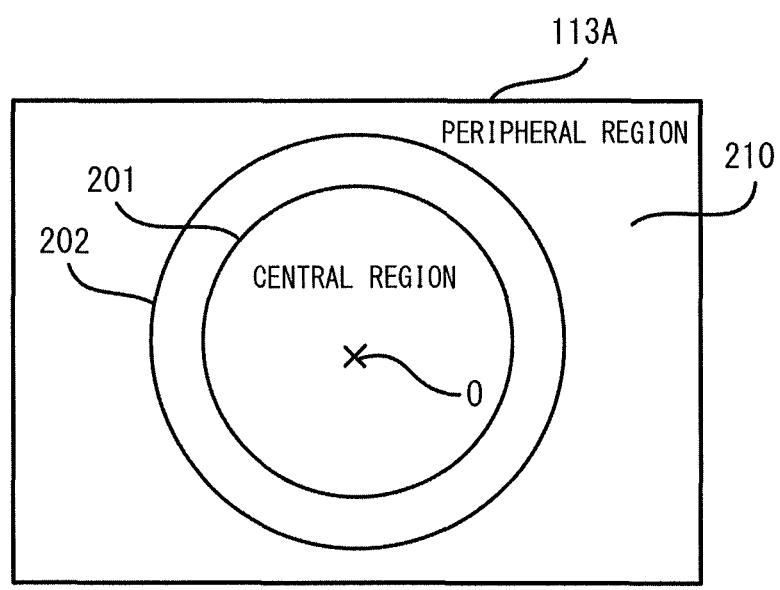

FIG. 11 is a flowchart showing control corresponding to the optical zoom shown in FIG. 10 (step S3). FIG. 12 includes diagrams showing the central region and peripheral region in the image capture region. In the process shown in FIG. 11, the first magnification change unit 71 performs the optical zoom on the basis of the operation of the optical zoom switch by the user (step S10). Specifically, the first magnification change unit 71 outputs, to the lens drive controller 15, a control signal corresponding to the operation amount of the optical zoom switch. Then, the image capture control unit 73 sets, in the center of the display panel 51, a region 200 [see FIG. 12(A)] including the center (optical axis) O of a magnification change (increase or reduction) made using the optical zoom in the pixel region (image capture region) 113A (step S11). Hereafter, the region including the center O of a magnification change made using the optical zoom will be referred to as the "central region." In the example shown in FIG. 12(A), the central region 200 is a circular region centered on the optical axis O. Also, the region other than the central region 200 in the pixel region 113A, as shown in FIG. 12(A), will be referred to as the "peripheral region 210."

Then, the image capture control unit 73 controls (changes) the size of the central region 200 in accordance with the speed of the magnification change made using the optical zoom (step S12). As used herein, the term "the speed of the magnification change" refers to the speed at which the magnification of an image is changed (increased or reduced) using the optical zoom. The first magnification change unit 71 detects the operation amount of the optical zoom switch per unit time on the basis of a signal from the optical zoom switch. The first magnification change unit 71 then determines the speed of the magnification change on the basis of the operation amount of the optical zoom switch. The operation amount of the optical zoom switch corresponds to the amount of movement (the amount of drive) of the zoom lens 11b. The image capture control unit 73 then outputs, to the drive unit 21, an instruction signal indicating the central region 200 corresponding to the speed of the magnification change.

The image capture control unit 73 then outputs an instruction signal to the drive unit 21 so that the image sensor 100 reads pixel signals in the regions (central region 200, peripheral region 210) of the pixel region 113A at different frame rates (step S13).

Typically, when the user is enlarging or shrinking an image (subject image) displayed on the display panel 51 by operating the optical zoom switch, the image radially flows in the peripheral region of the display panel 51 faster than in the central region thereof. When the image is flowing in the peripheral region fast, the user has difficulty in recognizing the image in the peripheral region and is less likely to carefully look at the image in the peripheral region. In contrast, when the user is enlarging or shrinking the image using the optical zoom, the user is paying attention to the image in the central region of the display panel 51. Further, the image flows faster as the speed of the magnification change is increased. Accordingly, the user pays attention to the image in a narrower central region.

For this reason, in step S12, the image capture control unit 73 controls the size of the central region 200, which the user is believed to be paying attention to, in accordance with the speed of the magnification change made using the optical zoom. For example, the image capture control unit 73 narrows the central region 200 as the speed of the magnification change is increased; it widens the central region 200 as the speed of the magnification change is reduced. The image capture control unit 73 outputs an instruction signal indicating the central region 200 corresponding to the speed of the magnification change.

In step S13, the image capture control unit 73 causes the drive unit 21 to read pixel signals at a high frame rate in the central region 200, which the user is paying attention to, as well as to read pixel signals at a low frame rate in the peripheral region 210, which the user is not paying attention to. For example, when capturing live view images, the image capture control unit 73 outputs, to the drive unit 21, an instruction signal indicating 60 fps as the frame rate of the central region 200 and an instruction signal indicating 30 fps as the frame rate of the peripheral region 210. On the basis of the instruction signals from the image capture control unit 73, the drive unit 21 reads pixel signals in the central region 200 at 60 fps, as well as reads pixel signals in the peripheral region 210 at 30 fps. Thus, live view images displayed on the display panel 51 move more smoothly in the central part thereof (the part corresponding to the central region 200) than in the peripheral region thereof (the part corresponding to the peripheral region 210).

In step S13, the image capture control unit 73 may cause the drive unit 21 to read pixel signals in the regions (central region 200, peripheral region 210) at different thinning-out rates rather than at different frame rates. For example, when capturing live view images, the image capture control unit 73 outputs, to the drive unit 21, an instruction signal indicating 0.5 as the thinning-out rate of the central region 200 and an instruction signal indicating 0.8 as the thinning-out rate of the peripheral region 210. The drive unit 21 reads pixel signals in the central region 200 at a thinning-out rate of 0.5, as well as reads pixel signals in the peripheral region 210 at a thinning-out rate of 0.8. Thus, live view images are displayed in the central region of the display panel 51 with higher resolution than in the peripheral region thereof.

In step S13, the image capture control unit 73 may also cause the drive unit 21 to sum up pixel signals in the regions (central region 200, peripheral region 210) with different summation numbers (summation row numbers or summation column numbers) rather than to read pixel signals in the regions at different frame rates. For example, when capturing live view images, the image capture control unit 73 outputs, to the drive unit 21, an instruction signal indicating "2" as the summation number of the central region 200 and an instruction signal indicating "5" as the summation number of the peripheral region 210. The drive unit 21 causes the arithmetic circuit 41 to sum up pixel signals using the summation numbers indicated by the instruction signals from the image capture control unit 73. The arithmetic circuit 41 sums up the signals of two rows or two columns of pixels stored in the pixel memory 415 corresponding to the central region 200, as well as sums up the pixel signals of five rows or five columns of pixels stored in the pixel memory 415 corresponding to the peripheral region 210. Thus, live view image are displayed in the central region of the display panel 51 with higher resolution than in the peripheral region thereof.

In step S13, the image capture control unit 73 may also cause the drive unit 21 to read pixel signals in the regions (central region 200, peripheral region 210) at different frame rates, as well as at different thinning-out rates. In step S13, the image capture control unit 73 may also cause the drive unit 21 to read pixel signals in the regions (central region 200, peripheral region 210) at different frame rates, as well as to sum up pixel signals in the regions with different summation numbers.

While, in FIG. 12(A), the image capture control unit sets the single central region 200 in the pixel region 113A, other configurations may be employed. For example, as shown in FIG. 12(B), the image capture control unit 73 may set two central regions, 201 and 202, in the pixel region 113A. More specifically, the image capture control unit 73 may set the annular central region 202 around the circular central region 201.

Even in this case, the image capture control unit 73, in step S12, controls (changes) the sizes of the two central regions, 201 and 202, in accordance with the speed of the magnification change made using the optical zoom. Note that the image capture control unit 73 may control the size of only one of the central regions 201 and 202.

As described above, in step S13, the image capture control unit 73 causes the drive unit 21 to read pixel signals in the regions (central regions 201 and 202, peripheral region 210) of the pixel region 113A at different frame rates. For example, the image capture control unit 73 causes the drive unit 21 to read pixel signals in the central region 201, which the user is paying highest attention to, at the highest frame rate (e.g., 60 fps). The image capture control unit 73 also causes the drive unit 21 to read pixel signals in the central region 202 at a lower frame rate (e.g., 30 fps) than that of the central region 202. The image capture control unit 73 also causes the drive unit 21 to read pixel signals in the peripheral region 210, which the user is not paying attention to, at a low frame rate (e.g., 15 fps). As described above, the image capture control unit may set different thinning-out rates or different summation numbers (summation row numbers or summation column numbers) for the regions rather than, or in addition to, setting different frame rates for the regions. The image capture control unit 73 may set three or more central regions in the pixel region 113A.

Referring back to FIG. 10, if the system control unit 70 determines that the user has not operated the optical zoom switch (NO in step S2), it determines whether the user has operated the electronic zoom switch (step S4). If the system control unit 70 determines that the user has operated the electronic zoom switch, the second magnification change unit and image capture control unit 73 perform control corresponding to the electronic zoom (step S5).

Figure 13:
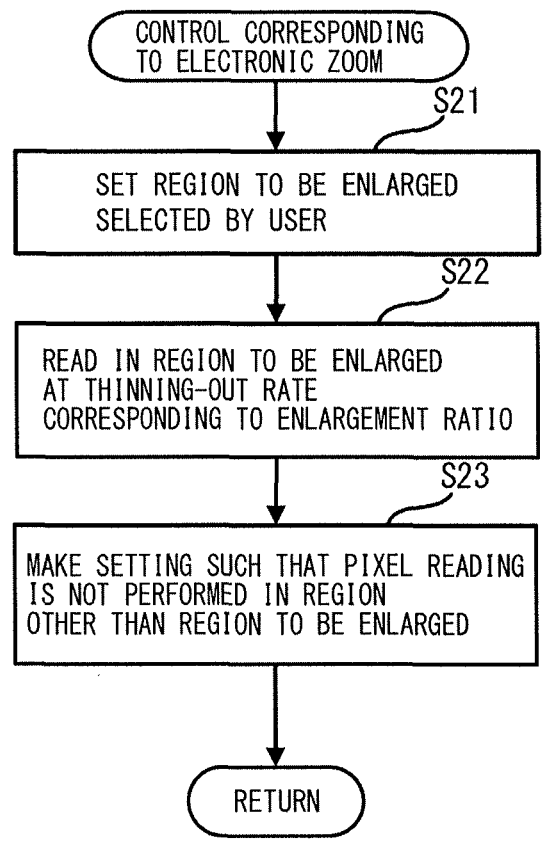
FIG. 13 is a flowchart showing control corresponding to the electronic zoom shown in FIG. 10.
Figure 14:
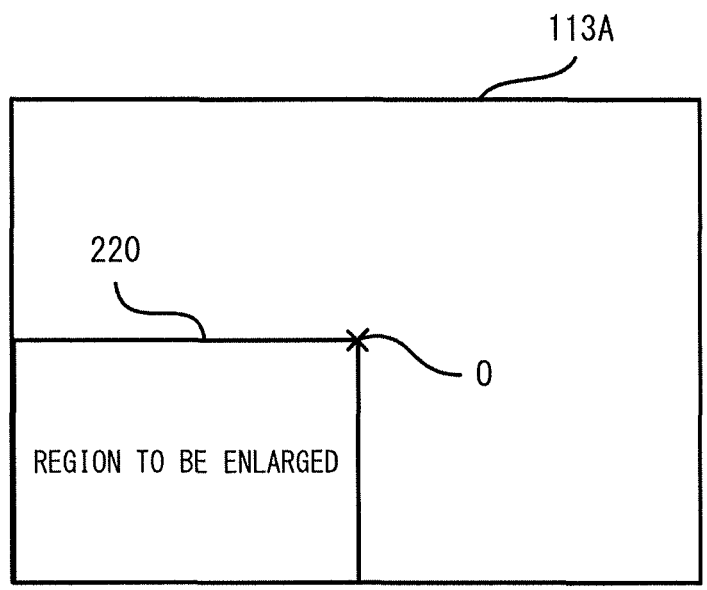
FIG. 14 is a diagram showing a region to be enlarged in the image capture region.

FIG. 13 is a flowchart showing control corresponding to the electronic zoom shown in FIG. 10 (step S5). FIG. 14 is a diagram showing a region to be enlarged in the image capture region. In the process shown in FIG. 13, the second magnification change unit 72 sets, in the pixel region (image capture region) 113A, a region 220 to be enlarged (see FIG. 14) selected in response to the operation of the touchscreen by the user (step S21). At this time, the second magnification change unit 72 outputs, to the image processing unit 30, a signal instructing the image processing unit 30 to cut out the region 220 to be enlarged. However, if the region 220 to be enlarged and the entire region of the display panel 51 have different aspect ratios, the image would be deformed after enlarged by the electronic zoom. For this reason, the second magnification change unit 72 sets the region 220 to be enlarged in such a manner that the region 220 to be enlarged has the same aspect ratio as that of the display panel 51.

Then, the image capture control unit 73 causes the drive unit 21 to read pixel signals in the region 220 to be enlarged set by the second magnification change unit 72 in step S21 at a thinning-out rate corresponding to the enlargement ratio of the electronic zoom (step S22). As used herein, the term "enlargement ratio" refers to the ratio between the area of the region to be enlarged and the area of the entire screen of the display panel 51. The "thinning-out rate corresponding to the enlargement ratio" is, for example, a thinning-out rate such that the resolution of the image enlarged by the electronic zoom becomes identical or similar to that of the yet-to-be-enlarged image.

Typically, the user does not need live view images or moving images to be captured with high resolution. Accordingly, while live view images or moving images are captured, pixel signals are read at a predetermined thinning-out rate. For example, while live view images are captured, pixel signals are read at a thinning-out rate of 0.75. That is, pixel signals are read from ¼ of all the pixels. On the other hand, when performing the electronic zoom, part of the image is cut out and displayed in an enlarged manner on the display unit 50. The enlargement of the image part using the electronic zoom reduces the resolution thereof (i.e., pixel density) and thus image quality. Depending on the enlargement ratio of the electronic zoom, image quality may be reduced remarkably. For this reason, in step S22, the image capture control unit 73 causes the drive unit 21 to read pixel signals at a thinning-out rate corresponding to the enlargement ratio of the electronic zoom.

For example, assume that the image is enlarged by a factor of 2 using the electronic zoom. Also assume that the thinning-out rate before performing the electronic zoom is 0.75 and the thinning-out rate after performing the electronic zoom is 0.5. That is, pixel signals are read from ¼ the pixels before performing the electronic zoom; pixel signals are read from ½ the pixels after performing the electronic zoom. In this case, the resolution of the image does not vary between before and after enlarging the image using the electronic zoom. Thus, a reduction in the resolution of the image after performing the electronic zoom is prevented.

Specifically, in step S22, the image capture control unit 73 calculates an enlargement ratio on the basis of the ratio between the area of the region 220 to be enlarged selected by the user and the area of the entire screen of the display panel 51. The image capture control unit 73 then calculates a thinning-out rate after performing the electronic zoom on the basis of the calculated enlargement ratio and the thinning-out rate before performing the electronic zoom. The image capture control unit 73 then outputs, to the drive unit 21, an instruction signal indicating the thinning-out rate after performing the electronic zoom. The drive unit 21 reads pixel signals from the region 220 to be enlarged at the thinning-out rate indicated by the image capture control unit 73.

Then, the image capture control unit 73 makes a setting such that pixel signals are not read from the region other than the region 220 to be enlarged in the pixel region 113A (step S23). This is because in the present embodiment, the image of the region other than the region 220 to be enlarged is not displayed on the display panel 51 after performing the electronic zoom and therefore there is no need to read pixel signals from that region.

In step S22, the image capture control unit 73 may cause the drive unit 21 to sum up pixel signals with a summation number (summation row number or summation column number) corresponding to the enlargement ratio rather than to read pixel signals at the thinning-out rate corresponding to the enlargement ratio. For example, assuming that the summation number before enlarging the image using the electronic zoom are "4" and the enlargement ratio is twice, the image capture control unit 73 outputs, to the drive unit 21, an instruction signal indicating "2" as the summation number after enlarging the image using the electronic zoom. Even in this configuration, it is possible to prevent the resolution of the image from varying between before and after enlarging the image using the electronic zoom.

Referring back to FIG. 10, if the system control unit 70 determines that the user has not operated the electronic zoom switch (NO in step S4), the image capture control unit 73 performs normal reading control (step S6). Specifically, the image capture control unit 73 outputs, to the drive unit 21, an instruction signal indicating normal image capture conditions (e.g., image capture conditions such that correct exposure is made) to capture live view images or moving images. The drive unit 21 causes the image capture unit 20 to capture images in the entire pixel region 113A on the normal image capture conditions.

The image capture unit 20 outputs the pixel signals read in steps S3, S5, and S6 to the image processing unit 30. The image processing unit 31 performs various types of image processing on pixel data composed of the pixel signals to generate image data in a predetermined file format. If the user has operated the electronic zoom switch, the image generation unit 31 cuts out the image data of the region 220 to be enlarged indicated by the second magnification change unit 72.

Then, the display control unit 74 outputs the image data generated by the image generation unit 31 to the display unit 50 so that images (moving images, live view images) are displayed on the display panel 51 (step S7). If the user has operated the electronic zoom switch, the display control unit 74 displays the image of the region 220 to be enlarged cut out by the image generation unit 31 over the entire surface of the display panel 51 (see FIG. 9).

While moving images are captured, the system control unit 70 stores the image data generated by the image generation unit 31 in the storage unit 60 (step S8). Subsequently, the system control unit 70 determines whether the image capture should be ended (step S9). If the user operates the operation unit 55 to end the capture of live view images or if the user operates the operation unit 55 (moving image switch) to end the capture of moving images, the system control unit 70 determines that the image capture should be ended. Otherwise, the system control unit 70 repeats the process shown in FIG. 10 (steps S1 to S9) at predetermined intervals until it determines that the image capture should be ended.

As described above, the digital camera 1 according to the first embodiment includes the display unit 50, which has the first display region in which a first image is displayed and the second display region in which a second image is displayed, the image capture unit 20, which has the first image capture region in which first image data indicating the first image is generated and the second image capture region in which second image data indicating the second image is generated, the magnification change units 71 and 72, which change the display magnifications of the first image and second image displayed on the display unit 50, and the image capture control unit 73, which when the magnification change units 71 and 72 change the display magnifications, changes the charge accumulation conditions or reading conditions of the first and second image capture regions.

The "first display region" when performing the optical zoom is, for example, a region on the display panel 51 corresponding to the central region 200 (or central regions 201, 202) on the image sensor 100; that when performing the electronic zoom is, for example, a region on the display panel 51 corresponding to the region 220 to be enlarged on the image sensor 100. The "second display region" when performing the optical zoom is, for example, a region on the display panel 51 corresponding to the peripheral region 210 on the image sensor 100; that when performing the electronic zoom is, for example, a region on the display panel 51 corresponding to the region other than the region 220 to be enlarged on the image sensor 100. The "first image capture region" when performing the optical zoom is, for example, the central region 200 (or central regions 201, 202) on the image sensor 100; that when performing the electronic zoom is, for example, the region 220 to be enlarged on the image sensor 100. The "second image capture region" when performing the optical zoom is, for example, the peripheral region 210 on the image sensor 100; that when performing the electronic zoom is, for example, the region other than the region 220 to be enlarged on the image sensor 100.

According to this configuration, it is possible to reduce power consumed when the display magnification of an image is changed using the optical zoom or electronic zoom. Specifically, when the optical zoom is performed, the image capture control unit 73 reads signals in the second image capture region (peripheral region 210) at a lower frame rate than that of the first image capture region (central region 200). Thus, power consumption can be reduced compared to that when reading signals in the pixel region 113A at a uniform high frame rate. Also, when the electronic zoom is performed, the image capture control unit 73 does not read signals from the second image capture region (the region other than the region 220 to be enlarged). Thus, power consumption can be reduced.

Cases in which the second magnification change unit 72 "changes the display magnification of the second image" include a case in which the second image is not displayed. Cases in which the image capture control unit 73 "changes the charge accumulation conditions or reading conditions of the first and second image capture regions" include a case in which signals are read in the first image capture region on predetermined charge accumulation conditions or reading conditions and in which signals are not read in the second image capture region.

In the first embodiment, the image capture control unit 73 changes at least one of the frame rates, pixel thinning-out rates, and pixel summation numbers serving as charge accumulation conditions or reading conditions. According to this configuration, when the image capture control unit 73 changes the frame rates of the first and second image capture regions, the first image and second image can move with different degrees of smoothness. Further, when the image capture control unit 73 changes the pixel thinning-out rates or pixel summation numbers of the first and second image capture regions, a difference can be made between the resolutions of the first and second images.

In the first embodiment, the image capture control unit 73 reduces the frame rate of the second image capture region, increases the pixel thinning-out rate thereof, and/or increases the pixel summation number thereof compared to those of the first image capture region. According to this configuration, when the image capture control unit 73 changes the frame rates of the first and second image capture regions, the first image can move more smoothly than the second image on the display unit 50. If the image capture control unit 73 changes the pixel thinning-out rates or pixel summation numbers of the first and second image capture regions, the resolution of the first image can be increased compared to that of the second image.

The digital camera 1 according to the first embodiment includes the different types of multiple magnification change units, 71 and 72, and the image capture control unit 73 causes the drive unit 21 to capture images on different charge accumulation conditions or reading conditions in accordance with the magnification change units 71 and 72. According to this configuration, the image capture control unit 73 can cause the drive unit 21 to capture images on charge accumulation conditions or reading conditions in each of regions suitable for the optical zoom, as well as can cause the drive unit 21 to capture images on charge accumulation conditions or reading conditions in each of regions suitable for the electronic zoom.

In the first embodiment, the image capture control unit 73 has the optical zoom which changes the display magnification of an image by moving the image capture optical system 11. According to this configuration, it is possible to make a difference between the charge accumulation conditions or reading conditions of the first and second image capture regions in accordance with a change in the display magnification of the image made using the optical zoom. In the first embodiment, the first image capture region is a region including the optical axis of the image capture optical system. According to this configuration, it is possible to obtain a smoothly moving image or high-resolution image in the first image capture region including the optical axis.

In the first embodiment, the magnification change unit 73 has the electronic zoom which cuts out and enlarges part of a captured image. According to this configuration, it is possible to make a difference between the charge accumulation conditions or reading conditions of the first and second image capture regions in accordance with a change in the display magnification of the image made using the electronic zoom. In the first embodiment, when the magnification change unit 72 changes the display magnification of the first image using the electronic zoom, the image capture control unit 73 performs control such that images are not captured in the second image capture region. According to this configuration, power consumption can be reliably reduced.

In the first embodiment, in response to the first magnification change unit 71 changing the display magnification, the image capture control unit 73 changes the first image capture region. According to this configuration, the first image capture region, which the user is paying attention to, as well as the second image capture region, which the user has difficulty in visually recognizing, are changed in accordance with the speed at which the image is enlarged or shrunk by the magnification change unit 71. Thus, even when the charge accumulation conditions or reading conditions of the first and second image capture regions are changed, a feeling of strangeness is not given to the user. It is also possible to cause the user to pay higher attention to the first image.

In the first embodiment, in response to the magnification change unit 71 or 72 changing the display magnification, the image capture control unit 73 changes the charge accumulation conditions or reading conditions. According to this configuration, it is possible to prevent the resolution of the image from varying (or significantly varying) while or between before and after changing the display magnification of the image. Thus, it is possible to prevent a feeling of strangeness from being given to the user while or between before and after changing the display magnification of the image.

Second Embodiment

In the first embodiment, the system control unit 70 sets a central region 200 in accordance with the speed of the magnification change or sets a region 220 to be enlarged selected by the user, regardless of what the subject is. In a second embodiment, on the other hand, a region including a main subject or a region including feature points of the main subject is set.

Figure 15:
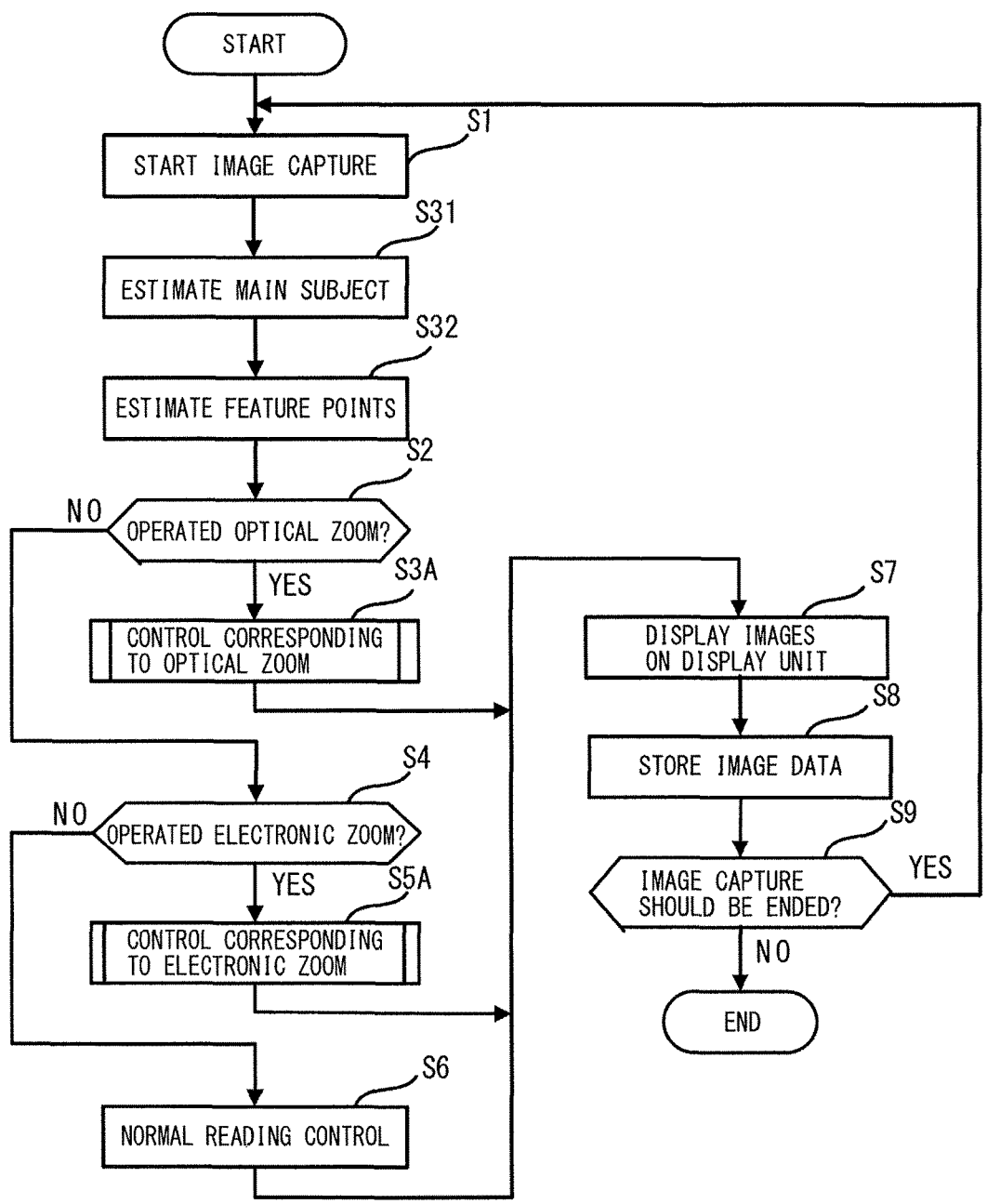
FIG. 15 is a flowchart showing an image capture process according to a second embodiment.

FIG. 15 is a flowchart showing an image capture process according to the second embodiment. In the process shown in FIG. 15, first, an image capture control unit 73 starts image capture (step S1). The image capture control unit 73 then outputs an instruction signal to a subject detection unit 32 so that the subject detection unit 32 estimates a main subject (step S31). The subject detection unit 32 receives the instruction signal from the image capture control unit 73 and detects (estimates) a human face serving as a main subject on the basis of image data generated by an image generation unit 31 using a known face detection function. The subject detection unit 32 then outputs a signal indicating the position and size of the detected human face to a system control unit 70.

The image capture control unit 73 also outputs an instruction signal to a feature point detection unit 33 so that the feature point detection unit 33 estimates feature points of the main subject (step S32). The feature point detection unit 33 receives the instruction signal from the image capture control unit 73 and detects (estimates) eyes serving as feature points of the main subject on the basis of image data generated by the image generation unit 31 using a known feature point detection function. The feature point detection unit 33 then outputs a signal indicating the positions and sizes of the detected human eyes to the system control unit 70.

Then, the system control unit 70 determines whether the user has operated an optical zoom switch (step S2). If the system control unit 70 determines that the user has operated the optical zoom switch, a first magnification change unit 71 and the image capture control unit 73 perform control corresponding to an optical zoom (step S3A).

Figure 16:
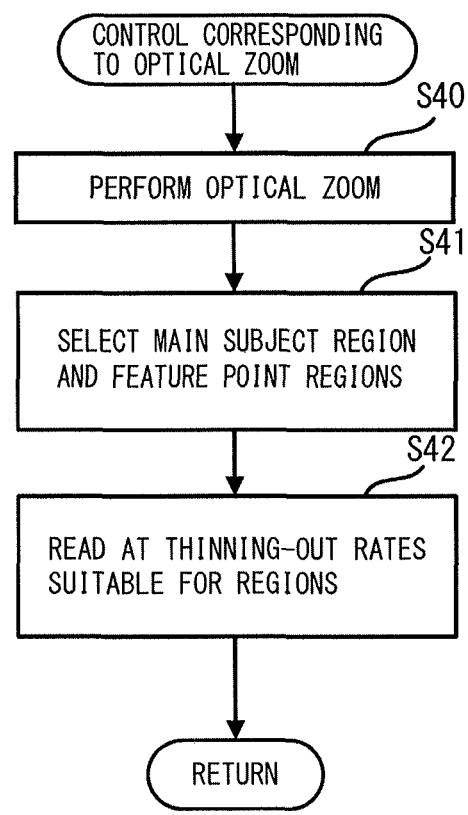
FIG. 16 is a flowchart showing control corresponding to an optical zoom shown in FIG. 15.
Figure 17:
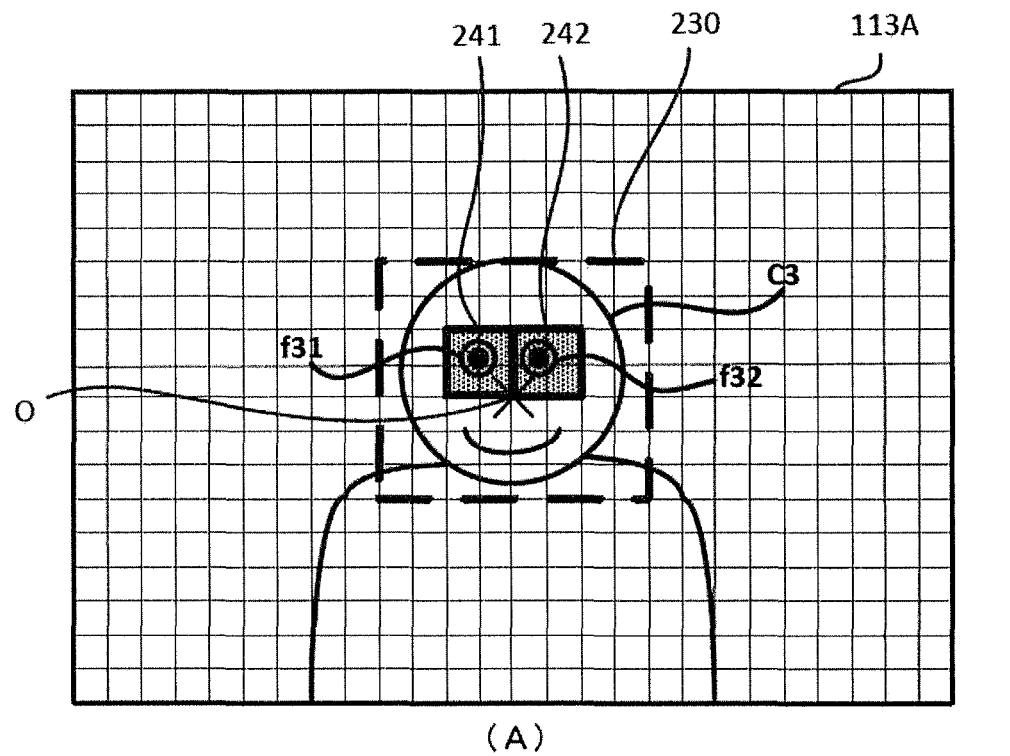
FIG. 17 is a diagram showing a main subject region and a feature point region set in an image capture region when performing the optical zoom.
Figure 17:
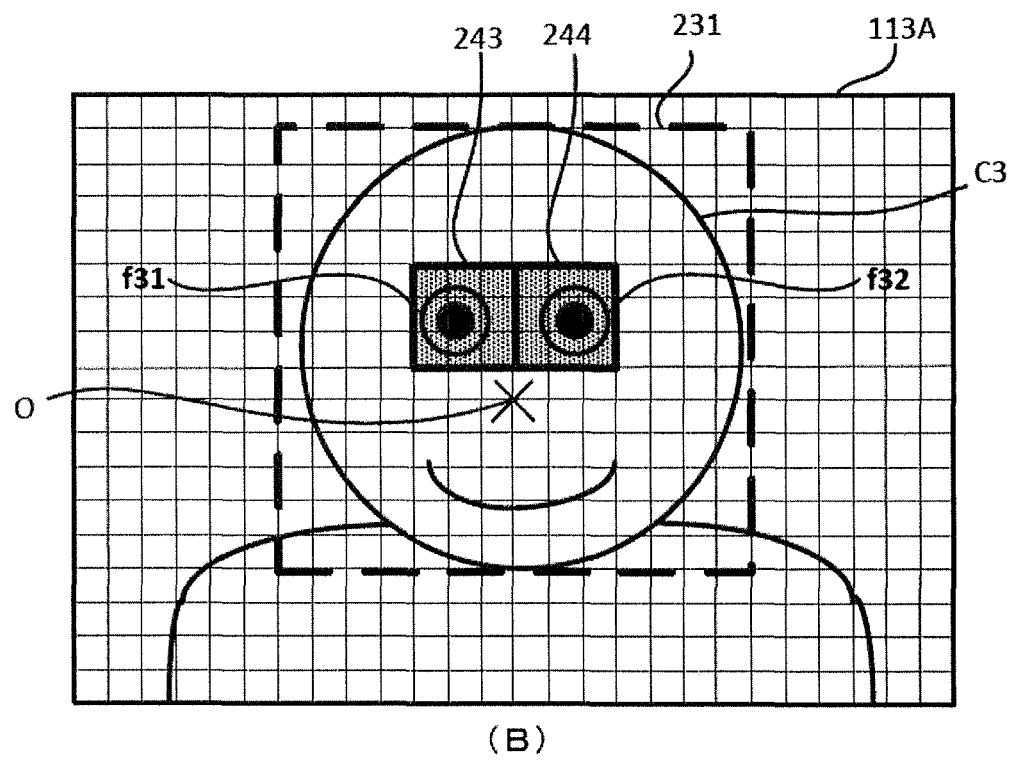

FIG. 16 is a flowchart showing the control corresponding to the optical zoom shown in FIG. 15 (step S3A). FIG. 17 is a diagram showing a main subject region and a feature point region set in the image capture region when performing the optical zoom. An example display shown in FIG. 17(A) shows the state before performing the optical zoom; an example display shown in FIG. 17(B) shows the state after performing the optical zoom.

In the process shown in FIG. 16, the first magnification change unit 71 performs the optical zoom on the basis of the operation of the optical zoom switch by the user (step S40). Specifically, the first magnification change unit 71 outputs, to a lens drive controller 15, a control signal corresponding to the operation amount of the optical zoom switch. Then, as shown in FIG. 17(A), the image capture control unit 73 selects a region [a main subject region 230 shown in FIG. 17(A)] including a face image C3 serving as a main subject and regions [feature point regions 241 and 242 shown in FIG. 17(A)] including eye images f31 and f32 serving as feature points of the main subject in units of blocks (step S41).

Specifically, the image capture control unit 73 selects the main subject region 230 including the face image C3 in units of blocks on the basis of a signal indicating the position and size of the face image C3 from the subject detection unit 32. The image capture control unit 73 also selects the feature point regions 241 and 242 including the eye images f31 and f32 serving as feature points in units of blocks on the basis of a signal indicating the positions and sizes of the eye images f31 and f32 from the feature point detection unit 33. Note that the main subject and feature points are not necessarily located in the central part including the optical axis O. However, while the optical zoom is performed, a main subject and feature points are typically located in the central part including the optical axis O.

As shown in FIG. 17(B), the human face image C3 is enlarged by the optical zoom. Since the size of the face image C3 is increased, the size of a main subject region 231 including the face image C3 is also increased. While the main subject region 230 shown in FIG. 17(A) is a region consisting of 7 vertical blocks×8 horizontal blocks, the main subject region 231 shown in FIG. 17(B) is a region consisting of 13 vertical blocks×14 horizontal blocks. As seen above, the size of the main subject region is changed by the optical zoom. Accordingly, in step S41, the image capture control unit 73 selects any main subject region corresponding to the magnification change made using the optical zoom.

As shown in FIG. 17(B), the eye images f31 and f32 are also enlarged by the optical zoom. Since the sizes of the eye images f31 and f32 are increased, the sizes of main subject regions 243 and 244 including the eye images f31 and f32 are also increased. While the main subject region 241 and 242 shown in FIG. 17(A) are each a region consisting of 2 vertical blocks×2 horizontal blocks, the main subject regions 243 and 244 shown in FIG. 17(B) are each a region consisting of 3 vertical blocks×3 horizontal blocks. As seen above, the sizes of the feature point regions are changed by the optical zoom. Accordingly, in step S41, the image capture control unit 73 selects any feature point regions corresponding to the magnification change made using the optical zoom.

While, in FIG. 17, the main subject region is a rectangular region including the main subject, it may be a circular region centered on the optical O as shown in FIG. 12. Even when the main subject region is such a circular region, it has to include the main subject. While the feature point region is a rectangular region including the feature points, it may be a circular region centered on the optical axis O as shown in FIG. 12. Even when the feature point region is such a circular region, it has to include the feature points.

Then, the image capture control unit 73 outputs an instruction signal to the drive unit 21 so that the drive unit 21 reads pixel signals at thinning-out rates suitable for the respective regions (main subject region, feature point region, other region) (step S42). Specifically, the image capture control unit 73 sets the lowest thinning-out rate for the feature point region; sets a higher thinning-out rate than that of the feature point region for the main subject region; and sets a higher thinning-out rate than that of the main subject region for the region other than the main subject region. The background image or the like other than the main subject image is estimated to be an image that the user is not paying attention to. For this reason, even when the image is blurred when enlarged or shrunk using the optical zoom, the user would not worry about the blurred image. Accordingly, the image capture control unit 73 increases the thinning-out rate of the region other than the main subject region to reduce the resolution of the image in that region.

On the other hand, the human eye images serving as feature points are estimated to be images that the user is paying highest attention to. For example, in portrait imaging, the user often matches the focal position with human eyes and wants to check whether the eyes are photogenic. For this reason, the image capture control unit 73 minimizes the thinning-out rate of the feature point region to maximize the resolution of the image in that region. The image of the human face serving as a main subject is estimated to be an image that the user is paying attention to. However, areas of a human, such as the skin, have low contrast and therefore do not require high resolution when images thereof are captured. For this reason, the image capture control unit 73 sets, for the main subject region, a thinning-out rate lower than that of the region other than the main subject region and higher than that of the feature point region.

When the magnification is changed fast, the image moves fast and therefore high resolution is not required. For this reason, the image capture control unit 73 may be configured to increase the thinning-out rates of the respective regions as the magnification is changed faster. In this case, the image capture control unit 73 may change the thinning-out rates of the regions to different degrees in accordance with the speed of the magnification change.

In step S42, the image capture control unit 73 may cause the drive unit 21 to sum up pixel signals with summation row numbers or summation column numbers suitable for the respective regions rather than to read pixel signals at thinning-out rates suitable for the regions. In step S42, the image capture control unit 73 may also cause the drive unit 21 to sum up pixel signals at frame rates suitable for the respective regions rather than to read pixel signals at thinning-out rates suitable for the regions.

Referring back to FIG. 15, if the system control unit 70 determines that the user has not operated the optical zoom switch (NO in step S2), it determines whether the user has operated the electronic zoom switch (step S4). If the system control unit 70 determines that the user has operated the electronic zoom switch, the second magnification change unit and image capture control unit 73 perform control corresponding to the electronic zoom (step S5A).

Figure 18:
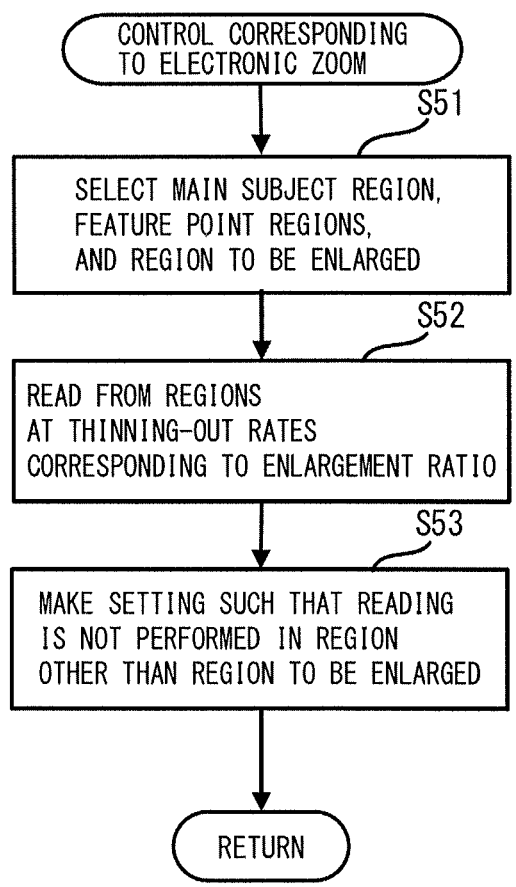
FIG. 18 is a flowchart showing control corresponding to an electronic zoom shown in FIG. 15.
Figure 19:
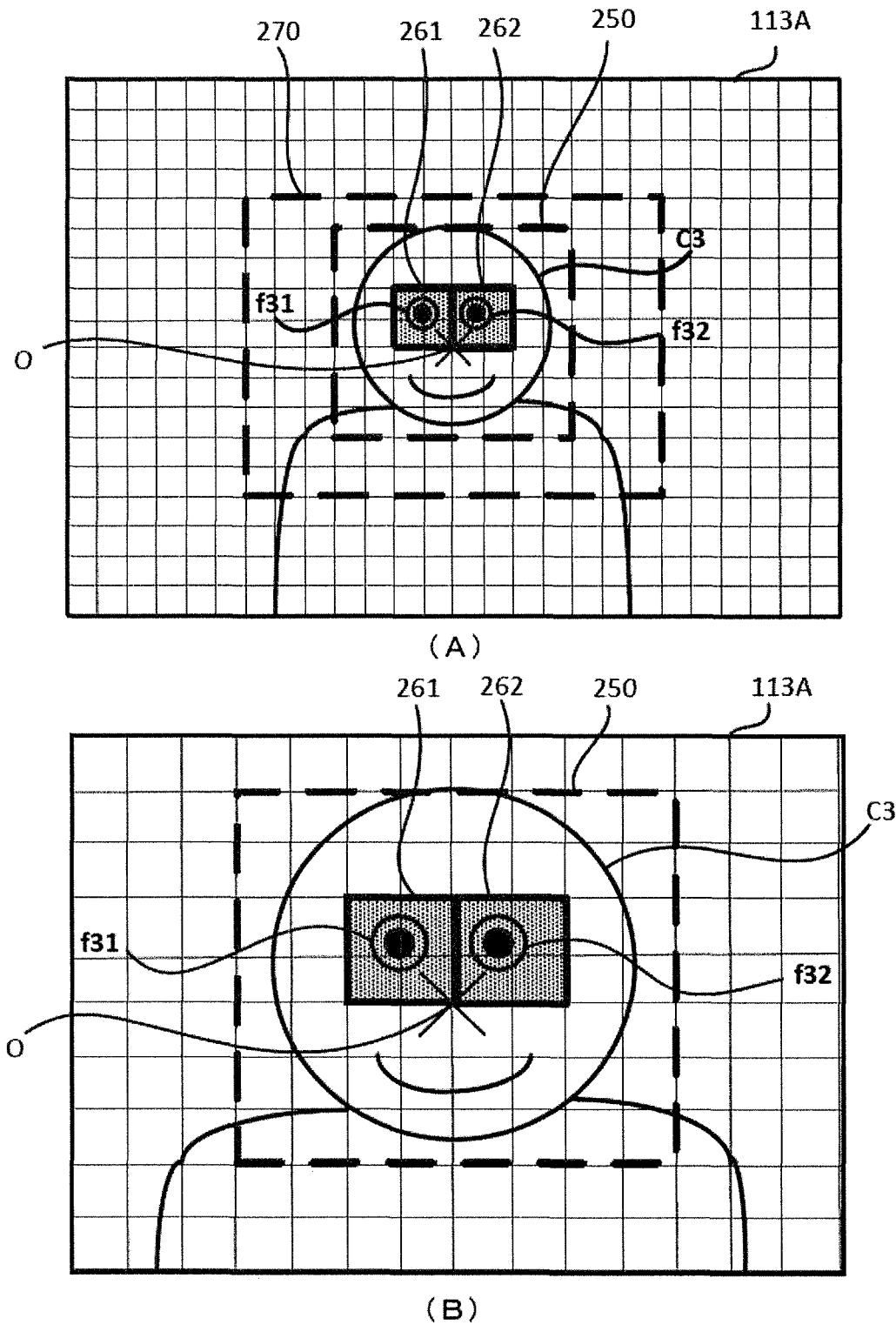
FIG. 19 is a diagram showing a main subject region and a feature point region set in the image capture region when performing the electronic zoom.

FIG. 18 is a flowchart showing the control corresponding to the electronic zoom shown in FIG. 15 (step S5A). FIG. 19 includes diagrams showing a main subject region and a feature point region set in the image capture region when performing the electronic zoom. In the process shown in FIG. 18, the second magnification change unit 72 selects, in the pixel region (image capture region) 113A, a region [a main subject region 250 shown in FIG. 19(A)] including an face image C3 serving as a main subject and regions [feature point regions 261 and 262 shown in FIG. 19(A)] including eye images f31 and f32 serving as feature points of the main subject in units of blocks. The second magnification change unit 72 also selects a region 270 to be enlarged including the main subject region 250 and feature point regions 261 and 262 (step S51). The second magnification change unit 72 then outputs, to the image processing unit 30, a signal instructing the image processing unit 30 to cut out the selected region 270 to be enlarged.

As seen above, the second magnification change unit 72 selects the region 270 to be enlarged including the main subject region 250 and feature point regions 261 and 262 as shown in FIG. 19(A) before performing the electronic zoom. That is, in the second embodiment, instead of the user, the second magnification change unit 72 automatically selects the main subject region in accordance with the main subject. In the example shown in FIG. 19(A), the main subject region 250 is a region consisting of 7 vertical blocks×8 horizontal blocks; the feature point regions 261 and 262 are each a region consisting of 2 vertical blocks×2 horizontal blocks; and the region 270 to be enlarged is a region consisting of 10 vertical blocks×14 horizontal blocks. Even when the image is enlarged using the electronic zoom as shown in FIG. 19(B), the sizes of the main subject region 250, the feature point regions 261 and 262, and the region to be enlarged are not changed. That is, the number of blocks included in each region is not changed.

Then, the image capture control unit 73 causes the drive unit 21 to read pixel signals from the respective regions in the region 270 to be enlarged selected in step S51 at thinning-out rates corresponding to the enlargement ratio of the electronic zoom (step S52). For example, the image capture control unit 73 sets, for the region 270 to be enlarged, a thinning-out rate such that the resolution of the image does not vary between before and after enlarging the image using the electronic zoom; sets, for the main subject region 250 in the region 270 to be enlarged, a lower thinning-out rate than that of the region other than the main subject region 250 in the region 270 to be enlarged; and sets, for the feature point regions 261 and 262, a higher thinning-out rate than that of the region other than the feature point regions 261 and 262 in the main subject region 250.

In step S52, the image capture control unit 73 calculates an enlargement ratio on the basis of the ratio between the area of the region 270 to be enlarged and the area of the entire surface of the display panel 51. The image capture control unit 73 then calculates thinning-out rates after performing the electronic zoom on the basis of the calculated enlargement ratio and the thinning-out rate before performing the electronic zoom. The image capture control unit 73 then outputs, to the drive unit 21, an instruction signal indicating the thinning-out rates of the respective regions after performing the electronic zoom. The drive unit 21 reads pixel signals from the respective regions in the region 270 to be enlarged at the thinning-out rates indicated by the image capture control unit 73.

Then, the image capture control unit 73 makes a setting such that pixel signals are not read from the region other than the region 270 to be enlarged in the pixel region 113A (step S53). This is because the image in the region other than the region 270 to be enlarged in the pixel region 113A is not displayed on the display panel 51 after performing the electronic zoom [see FIG. 19(B)] and therefore there is no need to read pixel signals from that region.

In step S52, the image capture control unit 73 may cause the drive unit 21 to sum up pixel signals with summation numbers (summation row numbers or summation column numbers) corresponding to the enlargement ratio rather than to read pixel signals at the thinning-out rates corresponding to the enlargement ratio.

Referring back to FIG. 15, if the system control unit 70 determines that the user has not operated the electronic zoom switch (NO in step S4), the image capture control unit 73 performs normal reading control (step S6). Steps S6 to S9 shown in FIG. 15 are similar to steps S6 to S9 shown in FIG. 10 and therefore the same reference signs are given and repeated description will be omitted.

As described above, a digital camera 1 according to the second embodiment includes the first detection unit 32, which detects a subject on the basis of an image captured by the image capture unit 20, and the image capture control unit sets a region (main subject region 230) including the subject detected by the first detection unit 32, as the first image capture region. According to this configuration, it is possible to keep high the resolution of the subject image that the user is paying attention to.

In the second embodiment, the digital camera 1 includes the second detection unit 33, which detects feature points on the basis of an image in a particular region, and the image capture control unit 73 changes the charge accumulation conditions or reading conditions of a third image capture region (e.g., feature point region) including the feature points and the region other than the third image capture region in the particular region. According to this configuration, it is possible to increase the resolution of images of the feature points, which the user is paying highest attention to.

Third Embodiment

In the first and second embodiments, when performing the electronic zoom, the image capture control unit 73 makes a setting such that signals are not read from the region other than the region to be enlarged, and the display control unit 74 displays the image of the region to be enlarged over the entire surface of the display panel 51 in an enlarged manner. In a third embodiment, on the other hand, an image capture control unit 73 reads signals even in the region other than the region to be enlarged. Further, in the third embodiment, a display control unit 74 displays the image of the region to be enlarged over the entire surface of a display panel 51 in an enlarged manner, as well as displays an image captured in an entire pixel region 113A, in a predetermined region on the entire surface of the display panel 51.

Figure 20:
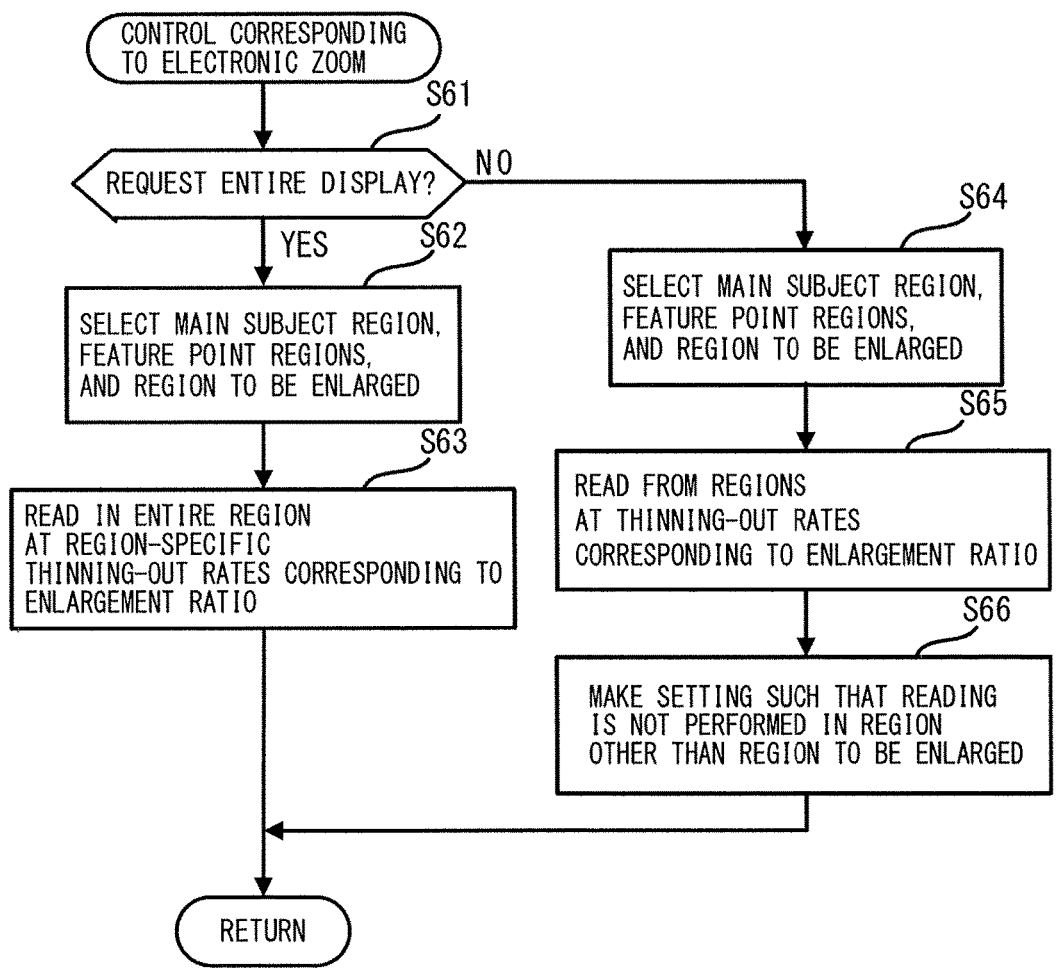
FIG. 20 is a flowchart showing control corresponding to an electronic zoom according to a third embodiment.

FIG. 20 is a flowchart showing control corresponding to an electronic zoom according to the third embodiment. The control corresponding to the electronic zoom shown in FIG. 20 is performed in step S5A in FIG. 15. The image capture control unit 73 determines whether, after performing the electronic zoom, the user has performed an operation requesting the display of the image of the region to be enlarged, as well as requesting the simultaneous display of an image captured in the entire pixel region 113A (hereafter referred to as the "entire display operation") (step S61).

A second magnification change unit 72 selects a main subject region, feature point regions, and a region to be enlarged in the pixel region (image capture region) 113A in units of blocks (step S62). Step S61 is similar to step S51. The image capture control unit 73 causes a drive unit 21 to read pixel signals in the pixel region 113A at region-specific thinning-out rates corresponding to the enlargement ratio of the electronic zoom (step S63). For example, the image capture control unit 73 sets, for the region to be enlarged, a thinning-out rate such that the resolution of the image does not vary between before and after enlarging the image using the electronic zoom; sets, for the main subject region in the region to be enlarged, a lower thinning-out rate than that of the region other than the main subject region in the region to be enlarged; sets, for the feature point regions, a higher thinning-out rate than that of the region other than the feature point region in the main subject region; and sets, for the region other than the region to be enlarged in the pixel region 113A, a higher thinning-out rate than that of the region to be enlarged. As seen above, in the third embodiment, pixel signals are read even in the region other than the region to be enlarged in the pixel region 113A. Note that the highest thinning-out rate is set for the region other than the region to be enlarged, since the user is not paying attention to that region.

If the image capture control unit 73 determines in step S61 that the user has not performed the entire display operation, the second magnification change unit 72 or image capture control unit 73 performs steps (steps S64 to S66 in FIG. 20) similar to steps S51 to S53 in FIG. 18.

Figure 21:
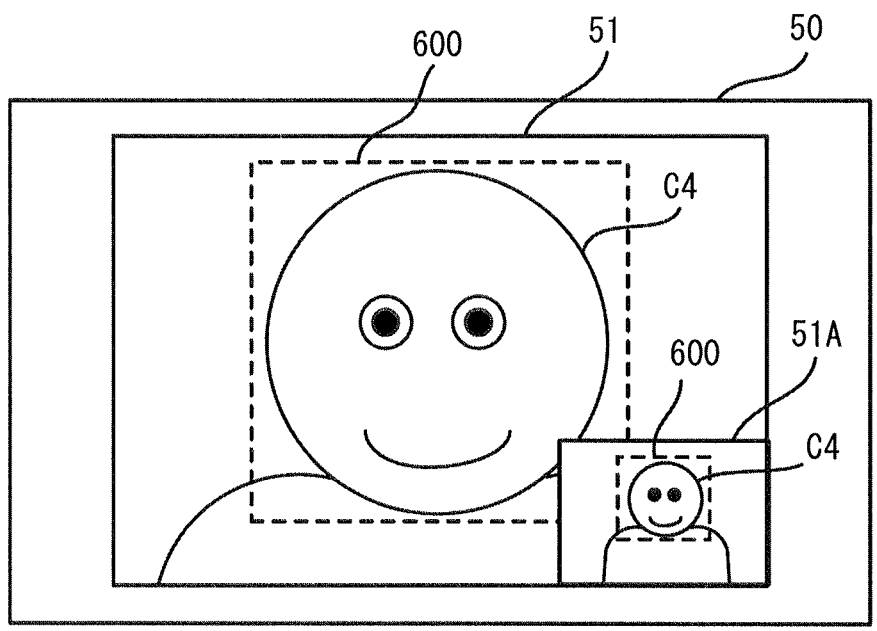
FIG. 21 is a diagram showing an example display when the electronic zoom is performed in the third embodiment.

FIG. 21 is a diagram showing an example display when the electronic zoom is performed in the third embodiment. In step S7 in FIG. 15, the display control unit 74 displays an image shown in FIG. 21 on the display panel 51. As shown in FIG. 21, a face image C4 [specifically, the image in the region 270 to be enlarged shown in FIG. 19(A)] serving as a main subject is displayed on the display panel 51 in an enlarged manner. A sub-screen 51A having a small region is disposed on a lower-right part of the display panel 51. An image captured in the entire pixel region 113A (an image of a human upper body) is displayed on the sub-screen 51A. Also, frames 600 surrounding the face images C4 are displayed on the display panel 51 and sub-screen 51A so that the user recognizes the position of each face image C4.

As described above, in the third embodiment, the image capture control unit 73 causes the drive unit 21 to read pixel signals in the entire pixel region 113A (see step S63). Thus, the display control unit 74 can display the image captured in the entire pixel region 113A, on the sub-screen 51A. Since the image displayed on the sub-screen 51A is small, a high thinning-out rate is set for the region other than the region to be enlarged.

Figure 22:
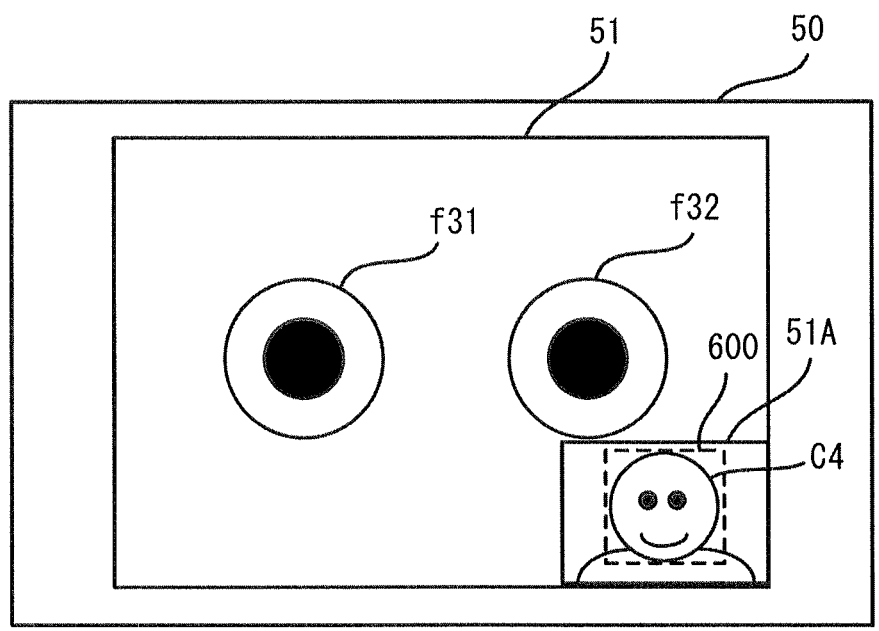
FIG. 22 is a diagram showing another example display when the electronic zoom is performed in the third embodiment.

FIG. 22 is a diagram showing another example display when the electronic zoom is performed in the third embodiment. In the example shown in FIG. 22, eye images f31 and f32 [specifically, the images in the feature point regions 261 and 262 shown in FIG. 19(A)] serving as feature points are displayed on the display panel 51 in an enlarged manner. The sub-screen 51A having a small region is disposed on the lower-right part of the display panel 51. The image of the region 270 to be enlarged is displayed on the sub-screen 51A. Also, a frame 600 surrounding the face image C4 is displayed on the sub-screen 51A so that the user recognizes the position of the face image C4.

As seen above, in the third embodiment, in response to the user operating the electronic zoom switch, the display control unit 74 can display the image in an enlarged manner using the electronic zoom in two stages (as shown in FIGS. 21 and 22).

As seen above, a digital camera 1 according to the third embodiment includes the display control unit 74, which simultaneously displays both a first image whose display magnification has been increased using the electronic zoom by the second magnification change unit 72 and a wide-region image (an image displayed on the sub-screen 51A) including the first image. According to this configuration, the user can check the wide-region image even after performing the electronic zoom. Further, in the third embodiment, the wide-region image is an entire image being captured by the image capture unit. Thus, the user can check the entire image even after performing the electronic zoom.

Fourth Embodiment

A fourth embodiment provides a configuration in which the digital camera 1 according to the first embodiment is divided into an image capture device 1A and an electronic apparatus 1B.

Figure 23:
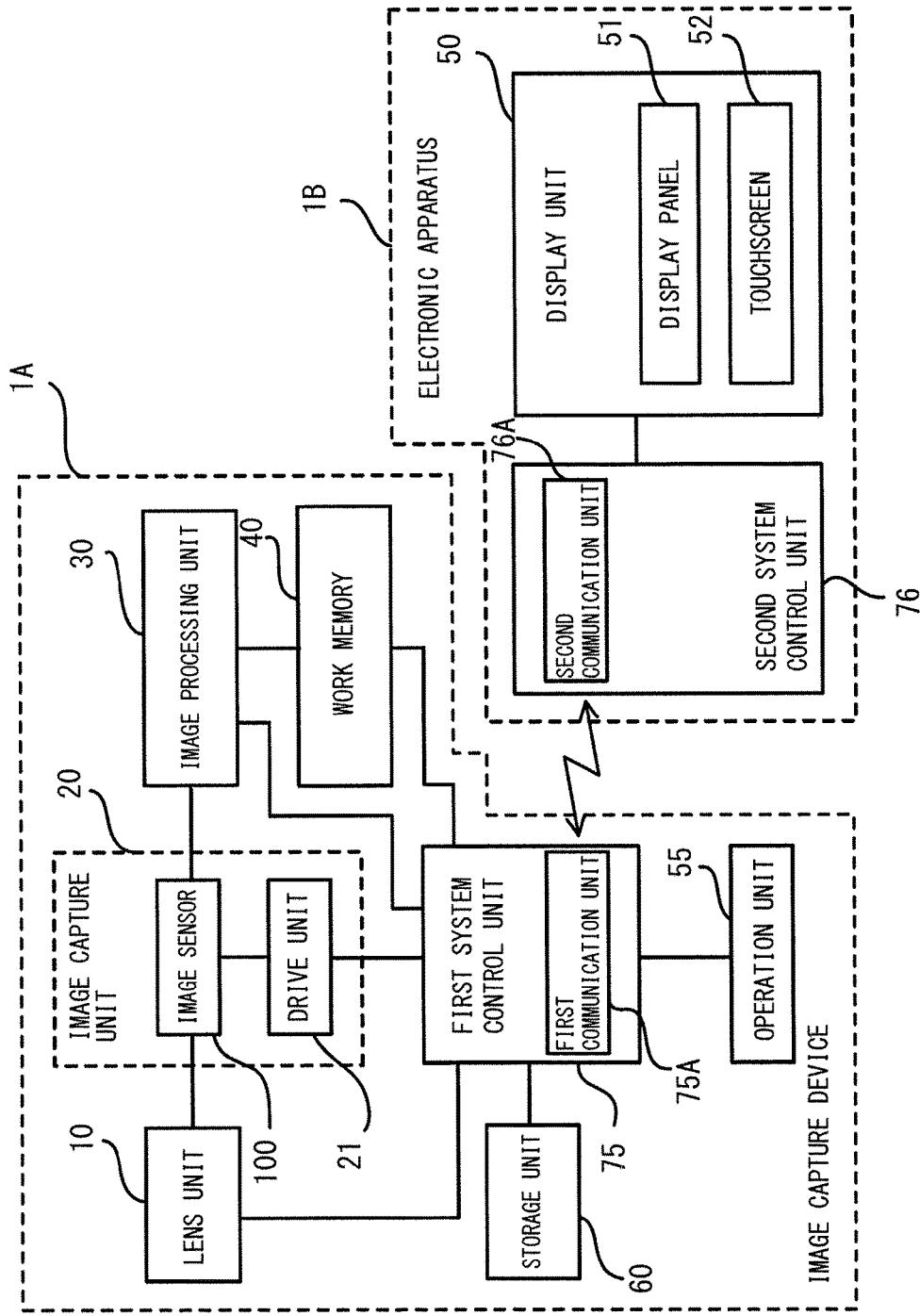
FIG. 23 is a block diagram showing the configuration of an image capture device and an electronic apparatus according to a fourth embodiment.

FIG. 23 is a block diagram showing the configuration of the imaging capture device and electronic apparatus according to the fourth embodiment. In the configuration shown in FIG. 23, the image capture device 1A captures images of subjects. The image capture device 1A includes a lens unit 10, an image capture unit 20, an image processing unit 30, a work memory 40, an operation unit 55, a storage unit 60, and a first system control unit 75. The image capture unit 20, image processing unit 30, work memory 40, operation unit 55, and storage unit 60 of the image capture device 1A are similar to those shown in FIG. 6. Accordingly, the same elements are given the same reference signs and will not be described repeatedly.

The electronic apparatus 1B displays images (still images, moving images, live view images). The electronic apparatus 1B includes a display unit 50 and a second system control unit (control unit) 70B. The display unit 50 of the electronic apparatus 1B has a configuration similar to that shown in FIG. 6. Accordingly, the same elements are given the same reference signs and will not be described repeatedly.

The first system control unit 75 includes a first communication unit 75A. The second system control unit 76 includes a second communication unit 76B. The first communication unit 75A and second communication unit 76B transmit and receive signals to and from each other by wire or wirelessly.

The elements shown in FIG. 7 (first magnification change unit 71, second magnification change unit 72, image capture control unit 73, and display control unit 74) may be disposed in any of the first system control unit 75 and second system control unit 76. Specifically, all the elements shown in FIG. 7 may be disposed in one of the first system control unit 75 and second system control unit 76, or some of the elements shown in FIG. 7 may be disposed in the first system control unit 75, and the other elements may be disposed in the second system control unit 76.

Examples of the image capture device 1A include digital cameras, smartphones, mobile phones, and personal computers which each have image capture and communication functions. Examples of the electronic apparatus 1B include smartphones, mobile phones, portable personal computers, and portable tablets which each have a communication function.

The first system control unit 75 shown in FIG. 23 is implemented when a CPU (not shown) performs processing on the basis of a control program. The second system control unit 76 shown in FIG. 23 is implemented when a CPU (not shown) performs processing on the basis of a control program.

In the configuration shown in FIG. 23, the image processing unit 30 and first system control unit 75 may be integral with each other. In this case, the functions of the image processing unit 30 and first system control unit 75 are implemented when a system control unit including one or more CPUs performs processing on the basis of a control program.

While the present invention has been described using the embodiments, the technical scope of the invention is not limited to the scope described in the embodiments. Various changes or modifications can be made to the embodiments without departing from the spirit and scope of the invention. One or more of the conditions described in the embodiments may be omitted. Any forms resulting from such changes, modifications, or omission fall within the technical scope of the invention. Elements of the embodiments or modifications thereof may be combined as appropriate and used.

While, in the above embodiments, the drive unit 21 is configured to control the drive of the pixels in the pixel region 113A and to thin out pixel signals at a predetermined thinning-out rate, other configurations may be employed. For example, the drive unit 21 may be configured not to control the drive of a predetermined proportion (a proportion corresponding to the thinning-out rate) of the pixels in the pixel region 113A and to control the drive of the other pixels. Even according to this configuration, there are produced effects similar to those when thinning out pixel signals at the predetermined thinning-out rate. The signal processing chip 111 or the like may be configured to discard pixel signals read from the pixels in the pixel region 113A. Even according to this configuration, there are produced effects similar to those when thinning out pixel signals at the predetermined thinning-out rate.

While, in the first embodiment, the first magnification change unit 71 changes the central region 200 in accordance with the speed of the magnification change, it may be configured not to change a central region having a predetermined size. The first magnification change unit 71 may also be configured to set a central region in accordance with a selection made by the user.

While, in the first embodiment, the second magnification change unit 72 sets a region 220 to be enlarged in accordance with a selection made by the user, a region corresponding to a main subject or feature points detected by the subject detection unit 32 may be automatically set as a region to be enlarged, as described in the second embodiment. While, in the second embodiment, the second magnification change unit 72 automatically sets a region corresponding to a main subject or feature points, as a region to be enlarged, a region to be enlarged may be set in accordance with a selection made by the user, as described in the first embodiment.

While, in the above embodiments, the digital camera 1 is used as an example of the electronic apparatus, the electronic apparatus is not limited to the digital camera 1. For example, the electronic apparatus may be any type of electronic apparatus having an image capture function, including smartphones, mobile phones, and personal computers. The display unit 50 of the digital camera 1 according to the first embodiment shown in FIG. 6 may be disposed outside the digital camera. In this case, the system control unit 70 and display unit 50 are each provided with a communication unit that receives and transmits signals (image data, control signals, etc.) by wire or wirelessly. The image processing unit 30 and system control unit 70 may be integral with each other. In this case, the respective functions of the image processing unit 30 and system control unit 70 are implemented when a system control unit including a single CPU performs processing on the basis of a control program.

While the color filters 102 form a Bayer array in the embodiments, they may form other types of arrays. Each unit group 131 only has to include at least one pixel. Each block also only has to include at least one pixel. Accordingly, it is also possible to capture images on image capture conditions which vary among the pixels.

In the above embodiments, some or all elements of the drive unit 21 may be included in the image capture chip 113 or signal processing chip 111. Some elements of the image processing unit 30 may be included in the image capture chip 113 or signal processing chip 111. Some or all elements of the system control unit 70 may be included in the image capture chip 113 or signal processing chip 111.

While, in the first embodiment, the charge accumulation conditions or reading conditions of the respective regions are changed, image capture conditions (e.g., control parameters of the image processing unit 30) other than the charge accumulation conditions or reading conditions of the regions may be changed in accordance with the image capture situation.

In the above embodiments, the optical zoom and electronic zoom may be performed simultaneously. Even in this case, it is possible to perform region-specific reading control during the optical zoom and region-specific reading control during the electronic zoom as described above.

While, in the above embodiments, the thinning-out rate or the like is changed so that the resolution of the image (image quality) does not vary between before and after performing the electronic zoom, the resolution of the image after performing the electronic zoom may be increased or reduced compared to that before performing the electronic zoom.

While, in the above embodiments, pixel signals are read even in the peripheral region when performing the optical zoom, pixel signals need not be read in the peripheral region.

DESCRIPTION OF REFERENCE SIGNS 1, 1B . . . digital camera, 1A . . . image capture apparatus, 20 . . . image capture unit, 30, 30A . . . image processing unit, 31 . . . image generation unit, 32 . . . subject detection unit (first detection unit), 33 . . . feature point detection unit (second detection unit), 50 . . . display unit, 51 . . . display panel (display screen), 52 . . . touchscreen (selection unit), 70 . . . system control unit, 70A . . . first system control unit, 70B . . . second system control unit, 71 . . . first magnification change unit (magnification change unit), 72 . . . second magnification change unit (magnification change unit), 73 . . . image capture control unit, 74 . . . display control unit, 100 . . . image sensor

The invention claimed is:

1. An electronic apparatus comprising:
an image capture unit having a first region in which first image data showing a first image is generated and a second region in which second image data showing a second image is generated;
a display having a first display region in which the first image is displayed and a second display region in which the second image is displayed;
a magnification change unit that changes display magnifications of the first and second images respectively displayed on the display; and
an image capture controller that when the display magnifications are changed by the magnification change unit, performs charge accumulation control or reading control of the first and second regions in accordance with changes in the display magnifications of the first and second images made by the magnification change unit,
wherein the image capture controller performs the charge accumulation control or the reading control differently for the first region compared to the second region based on the display magnifications set for the first and second images respectively.

2. The electronic apparatus of claim 1, wherein the image capture controller controls at least one of frame rates, pixel thinning-out rates, and pixel summation numbers as the charge accumulation control or the reading control.

3. The electronic apparatus of claim 2, wherein the image capture controller performs at least one of (i) reduction of the frame rates, (ii) an increase in the pixel thinning-out rates, and (iii) an increase in the pixel summation numbers of the second region relative to the first region.

4. The electronic apparatus of claim 1, wherein the magnification change unit includes an optical zoom that changes a display magnification of an image by moving an image capture optical system.

5. The electronic apparatus of claim 4, wherein the first region includes an optical axis of the image capture optical system.

6. The electronic apparatus of claim 1, wherein the magnification change unit includes an electronic zoom that cuts out and enlarges a part of a captured image.

7. The electronic apparatus of claim 6, wherein when the magnification change unit changes the display magnification of the first image using the electronic zoom, the image capture controller performs control such that images are not captured in the second region.

8. The electronic apparatus of claim 6, further comprising a display controller that simultaneously displays both (i) the first image in which a display magnification has been increased by the magnification change unit using the electronic zoom and (ii) a wide-region image including the first image.

9. The electronic apparatus of claim 8, wherein the wide-region image is an entire image being captured by the image capture unit.

10. The electronic apparatus of claim 1, wherein in response to a change to a display magnification made by the magnification change unit, the image capture controller changes a size of the first region.

11. The electronic apparatus of claim 1, wherein in response to a change to a display magnification made by the magnification change unit, the image capture controller changes charge accumulation conditions or reading conditions.

12. The electronic apparatus of claim 1, further comprising a first detector configured to detect a subject based on an image captured by the image capture unit, wherein
the image capture controller sets as the first region a region including the subject detected by the first detector.

13. The electronic apparatus of claim 12, further comprising a second detector configured to detect a feature point based on the first image or the second image, wherein
the image capture controller performs, in the first image or the second image, the charge accumulation control or the reading control of (i) a third region that includes the feature point and (ii) a region other than the third region.

14. The electronic apparatus of claim 1, wherein the display displays the second image peripheral to the first image.

15. A method for controlling an electronic apparatus, the method comprising:
setting in an image capture unit a first region in which first image data showing a first image is generated and a second region in which second image data showing a second image is generated;
controlling display magnifications of the first and second images respectively displayed on first and second display regions of a display; and
performing charge accumulation control or reading control of the first and second regions in accordance with changes in the display magnifications when the display magnifications of the first and second images are changed,
wherein the step of performing the charge accumulation control or the reading control performs the charge accumulation control or the reading control differently for the first region compared to the second region based on the display magnifications set for the first and second images respectively.

16. A non-transitory computer-readable storage medium storing a control program for causing a controller of an electronic apparatus to perform steps of:
setting in an image capture unit a first region in which first image data showing a first image is generated and a second region in which second image data showing a second image is generated;
controlling display magnifications of the first and second images respectively displayed on first and second display regions of a display; and
performing accumulation control or reading control of the first and second regions in accordance with changes in the display magnifications when the display magnifications of the first and second images are changed,
wherein the step of performing the charge accumulation control or the reading control performs the charge accumulation control or the reading control differently for the first region compared to the second region based on the display magnifications set for the first and second images respectively.

* * * * *